(12) United States Patent
Gilbertson et al.

(10) Patent No.: US 12,117,115 B2
(45) Date of Patent: Oct. 15, 2024

(54) ELECTRICAL PASS-THROUGH ASSEMBLY FOR TRAVERSING A STRUCTURE

(71) Applicant: The Boeing Company, Chicago, IL (US)

(72) Inventors: Michael L. Gilbertson, Arlington, WA (US); Mark L. Carpenter, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 17/695,156

(22) Filed: Mar. 15, 2022

(65) Prior Publication Data

US 2022/0297850 A1    Sep. 22, 2022

Related U.S. Application Data

(60) Provisional application No. 63/162,157, filed on Mar. 17, 2021.

(51) Int. Cl.
*F16L 5/10* (2006.01)
*B64C 3/18* (2006.01)
(Continued)

(52) U.S. Cl.
CPC .............. *F16L 5/10* (2013.01); *H02G 3/0406* (2013.01); *H02G 3/0456* (2013.01);
(Continued)

(58) Field of Classification Search
CPC ....... F16L 5/10; H02G 3/0406; H02G 3/0456; H02G 3/0481; H02G 3/22; B64D 2221/00;
(Continued)

(56) References Cited

U.S. PATENT DOCUMENTS 2,913,260 A * 11/1959 Givens .................... F16L 5/027
                                                     285/151.1
5,755,463 A *  5/1998 Davidson ................. F16L 5/10
                                                      285/46
(Continued)

FOREIGN PATENT DOCUMENTS

EP    2416463 A2    2/2012
EP    3428056 A1    1/2019
(Continued)

OTHER PUBLICATIONS

European Patent Office. Extended European Search Report for EP Application No. 22161762.4, mailed Jul. 29, 2022, pp. 1-11.

*Primary Examiner* — Hoa C Nguyen
*Assistant Examiner* — Amol H Patel
(74) *Attorney, Agent, or Firm* — Vivacqua Crane, PLLC

(57) ABSTRACT

An electrical pass-through assembly for traversing a structure includes a sleeve defining a fixed end, a locked end, a passage extending between the fixed end and the locked end, a mating feature disposed on the fixed end, and a locking feature disposed on the locked end. The electrical pass-through assembly also includes a fitting configured to attach the structure. The fitting includes an inner surface defining an opening shaped to receive the fixed end of the sleeve. A corresponding mating feature is disposed along the inner surface of the fitting and engages with the mating feature disposed at the fixed end of the sleeve to prevent relative rotation between the fitting and the sleeve. The electrical pass-through assembly also includes a locking retainer including a corresponding locking feature that securely engages with the locking feature disposed at the locked end of the sleeve.

20 Claims, 19 Drawing Sheets

(51) Int. Cl.
*H02G 3/04* (2006.01)
*H02G 3/22* (2006.01)

(52) U.S. Cl.
CPC ............. *H02G 3/0481* (2013.01); *H02G 3/22* (2013.01); *B64D 2221/00* (2013.01)

(58) Field of Classification Search
CPC .. B64C 3/185; B60R 16/0215; B60R 16/0222
See application file for complete search history.

(56) References Cited

U.S. PATENT DOCUMENTS

| | | |
|---|---|---|
| 2008/0149761 A1 | 6/2008 | Nakazawa et al. |
| 2009/0032281 A1* | 2/2009 | Turcovsky ................ F16L 5/10 174/83 |
| 2015/0229115 A1* | 8/2015 | George ............ H01R 13/65914 174/72 A |

FOREIGN PATENT DOCUMENTS

| | | |
|---|---|---|
| FR | 3085089 A1 | 2/2020 |
| WO | 2014070851 A1 | 5/2014 |
| WO | 2020077121 A1 | 4/2020 |

* cited by examiner

ELECTRICAL PASS-THROUGH ASSEMBLY FOR TRAVERSING A STRUCTURE

CROSS-REFERENCE TO RELATED APPLICATION

This application claims priority to U.S. Provisional Application No. 63/162,157, filed Mar. 17, 2021. The contents of the application are incorporated herein by reference in its entirety.

INTRODUCTION

The present disclosure relates to an electrical pass-through assembly for traversing a structure. More particularly, the present disclosure is directed towards an electrical pass-through assembly including a sleeve having a fixed end and a locked end.

BACKGROUND

Carbon fiber reinforced plastic (CFRP) materials are increasingly being used in place of aluminum materials to form skin panels and structural members of an aircraft. For example, the wings of an aircraft may be constructed of CFRP materials. It is to be appreciated that CFRP materials provide several advantages when compared to aluminum materials such as, for example, higher strength-to-weight ratios. However, CFRP materials offer less protection against electromagnetic effects (EME) created by lightning strikes when compared to aluminum materials.

Fuel tanks are commonly located within the aircraft wings. For example, surge fuel tanks are commonly located within the wing tips of an aircraft where space is restricted. However, because of the reduced EME protection afforded by CFRP materials, conductive systems of the aircraft's fuel tanks may be forced to carry more of the current induced by a lightning strike event. Sparking caused by a lightning strike is to be avoided in the presence of fuel vapors outboard of the wing's fuel tanks. As a result, in conventional systems, power feeder wires do not pass through areas of the CFRP wing that may potentially comprise a threshold amount of volatile liquid or gases (e.g., fuel vapor), such as the area outboard of the surge fuel tank (e.g., a leakage zone located outboard of the surge fuel tank). Instead, the power feeder wires are typically routed along either the wing's front spar or rear spar.

There may be drawbacks to routing the power feeder wires along either the front or rear spar. This is because some external components of the aircraft, such as the windshield, the nose, and the leading and trailing edges of the wings, may experience less than optimal performance caused by object impact. For example, a bird strike may occur along the leading edge of one of the aircraft's wings. Since the front spar is disposed along the leading edge and the rear spar is disposed along the trailing edge of the aircraft's wings, the power feeder wires that are routed along the front or rear spar may experience less than optimal performance during object impact. Therefore, there is a desire for an improved system and method for routing power feeder wires through enclosed spaces that may potentially comprise volatile liquid or gas. There is also a desire for an improved system and method for routing power feeder wires through areas of an aircraft wing, such as the area of the wing outboard of the surge fuel tank.

Additionally, it is also to be appreciated that the aircraft wing is also subject to thermal expansion and contraction as well as vibration during operation. Therefore, there is a desire for an improved system and method for routing power feeder wires through a structure that is subject to expansion, contraction, and vibration.

SUMMARY

According to several aspects, an electrical pass-through assembly for traversing a structure is disclosed. The electrical pass-through assembly includes a sleeve defining a fixed end, a locked end, a passage extending between the fixed end and the locked end, a mating feature disposed on the fixed end, and a locking feature disposed on the locked end. The electrical pass-through assembly also includes a fitting configured to attach the structure. The fitting includes an inner surface defining an opening shaped to receive the fixed end of the sleeve, where a corresponding mating feature is disposed along the inner surface of the fitting and engages with the mating feature disposed at the fixed end of the sleeve to prevent relative rotation between the fitting and the sleeve. The electrical pass-through assembly also includes locking retainer including a corresponding locking feature that securely engages with the locking feature disposed at the locked end of the sleeve.

In another aspect, an aircraft wing includes a front spar, a rear spar, and an electrical pass-through assembly extending lengthwise through the front spar and the rear spar. The electrical pass-through assembly includes a sleeve defining a fixed end, a locked end, a passage extending between the fixed end and the locked end, a mating feature disposed on the fixed end, and a locking feature disposed on the locked end. The electrical pass-through assembly also includes a fitting configured to attach the front spar, the fitting including an inner surface defining an opening shaped to receive the fixed end of the sleeve, where a corresponding mating feature is disposed along the inner surface of the fitting and engages with the mating feature disposed at the fixed end of the sleeve to prevent relative rotation between the fitting and the sleeve. The assembly also includes locking retainer including a corresponding locking feature that securely engages with the locking feature disposed at the locked end of the sleeve.

In still another aspect, a method of installing an electrical pass-through assembly that traverses a structure includes attaching a fitting to the structure, wherein the fitting includes an inner surface defining an opening. The method includes inserting a sleeve within the opening of the fitting, wherein the sleeve includes a fixed end, a locked end, a passage extending between the fixed end and the locked end, a mating feature disposed on the fixed end, and a locking feature disposed on the locked end. The method also includes engaging the mating feature disposed on the fixed end of the sleeve with a corresponding mating feature disposed along the inner surface of the fitting to prevent relative rotation between the fitting and the sleeve. The method includes securely engaging the locking feature disposed on the locked end of the sleeve with a corresponding locking feature that is part of a locking retainer. Finally, the method includes sliding one or more wiring harness sleeves through the sleeve, where the one or more wiring harness sleeves extend along a longitudinal axis of the sleeve and extend through both the fixed end and the locked end.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards an electrical pass-through assembly for traversing a structure. In one non-limiting example, the electrical pass-through assembly traverses the front spar and the rear spar of an aircraft wing. The electrical pass-through assembly includes a sleeve defining a fixed end, a locked end, a passage extending between the fixed end and the locked end, a mating feature disposed on the fixed end, and a locking feature disposed on the locked end. Both the fixed end and the locked end of the sleeve are sealed to prevent contaminants from entering the sleeve. The electrical pass-through assembly also includes a fitting that is attached to the structure. If the structure is an aircraft wing, the fitting is attached to a front spar of the wing. The fitting includes a corresponding mating feature disposed along an inner surface of the fitting that engages with the mating feature disposed at the fixed end of the sleeve to prevent relative rotation between the fitting and the sleeve. The electrical pass-through assembly also includes a locking retainer including a corresponding locking feature that securely engages with the locking feature disposed at the locked end of the sleeve. The electrical pass-through assembly further includes one or more wiring harness sleeves that are secured within the sleeve. The wiring harnesses are secured so as to prevent rotation or translation within the sleeve.

The following description is merely exemplary in nature and is not intended to limit the present disclosure, application, or uses.

Figure 1:
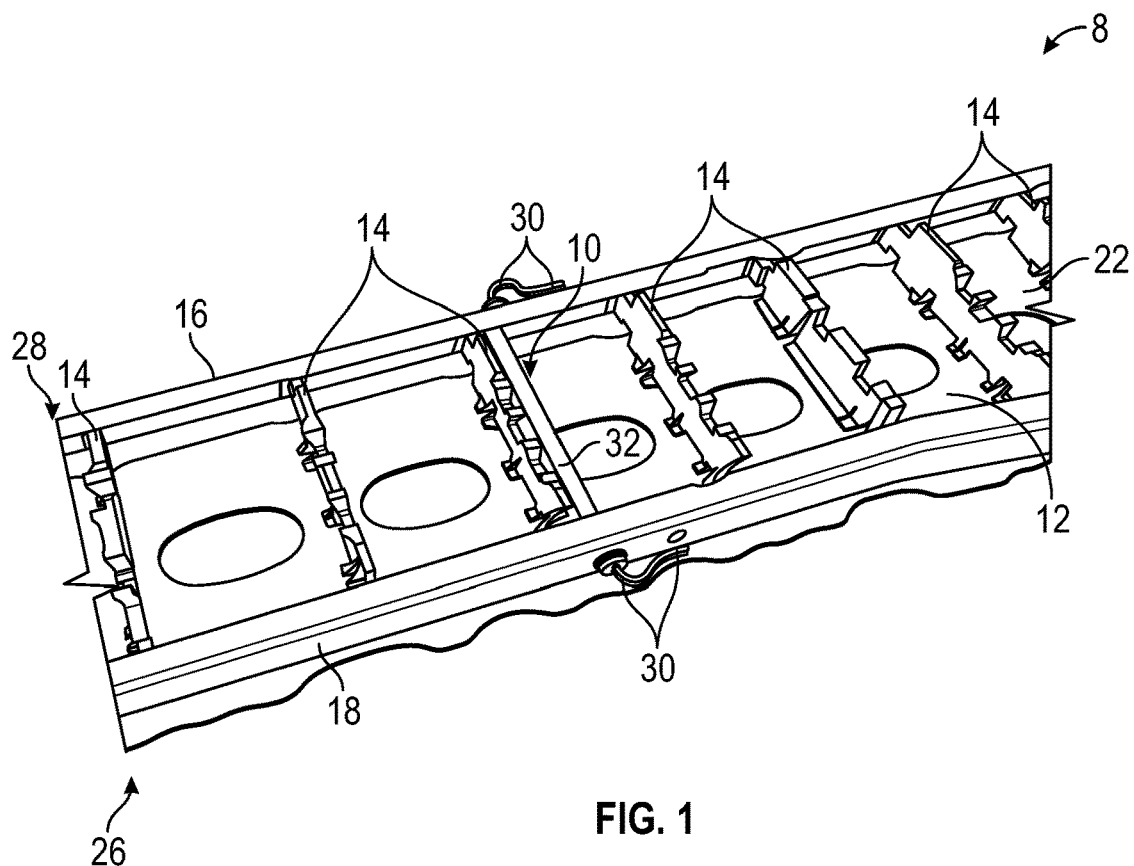
FIG. 1 is an illustration of a skeletal structure of an aircraft wing including the disclosed electrical pass-through assembly, according to an exemplary embodiment.

Referring to FIG. 1, an electrical pass-through assembly 10 that traverses a structure 12 is illustrated. In the non-limiting embodiment as shown in FIG. 1, the structure 12 is represented by an aircraft wing 8. FIG. 1 illustrates a skeletal structure of the aircraft wing 8, which includes a front spar 16, a rear spar 18, a plurality of ribs 14, and a lower cover 22. The plurality of ribs 14 extend between the front spar 16 and the rear spar 18. FIG. 1 is viewed from an aft end 26 of the aircraft wing 8. In an example, aircraft wing 8 is a composite wing constructed of composite materials. In one embodiment, the aircraft wing 8 may be constructed of carbon fiber reinforced plastic (CFRP) materials. The electrical pass-through assembly 10 extends lengthwise through respective openings (not visible in FIG. 1) in the front spar 16 and the rear spar 18 of the aircraft wing 8. The electrical pass-through assembly 10 secures one or more wiring harnesses 30 within a sleeve 32. In an example, the wiring harnesses 30 comprise power feeder wires, such as power feeder wires for equipment such as an actuator. It is to be appreciated that the electrical pass-through assembly 10 may be located in areas of the aircraft wing 8 that may potentially comprise volatile liquid or gases (e.g., fuel vapor), such as an area outboard of a surge fuel tank (not shown) located within the aircraft wing 8. In an example, the area outboard of a surge fuel tank comprises a vapor leakage zone. As explained below, the electrical pass-through assembly 10 protects the one or more wiring harnesses 30 from the environment within the aircraft wing 8.

Although FIG. 1 illustrates the structure 12 as an aircraft wing, it is to be appreciated that this illustration is merely exemplary in nature. Indeed, the electrical pass-through assembly 10 may be used in a variety of other applications and is not limited to an aircraft wing. Specifically, in one embodiment, the electrical pass-through assembly 10 may be used to pass high voltage wires through an enclosed space that may potentially comprise volatile liquid or gases (e.g., fuel vapor). One example is a confined area within a facility that produces volatile compounds, such as an oil refinery.

Figure 2A:
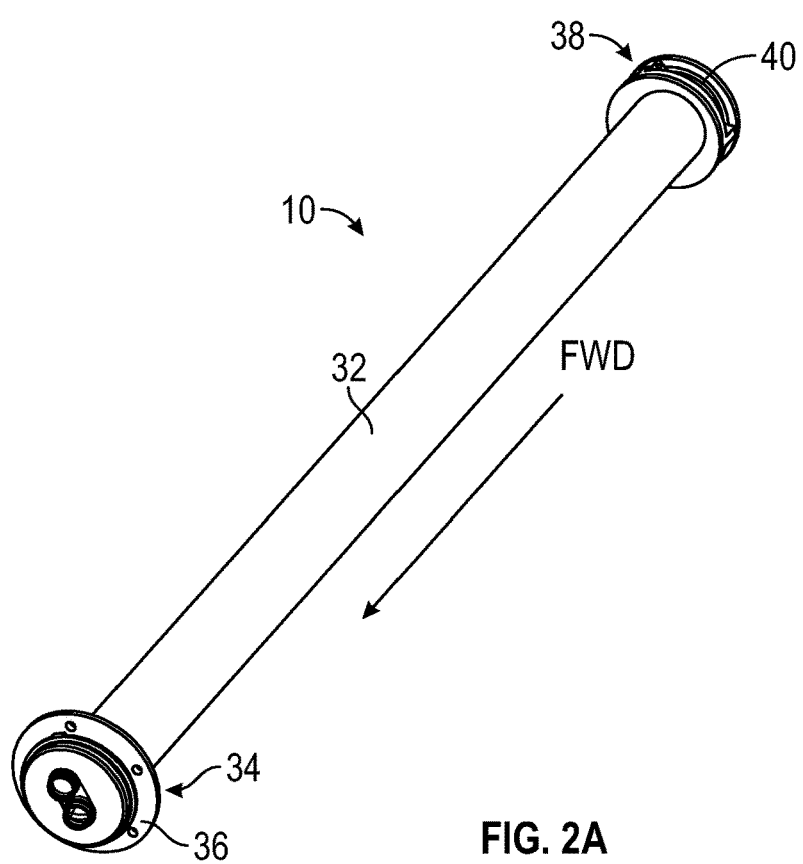
FIG. 2A illustrates the electrical pass-through assembly viewed from a forward end of the aircraft wing, according to an exemplary embodiment.
Figure 2B:
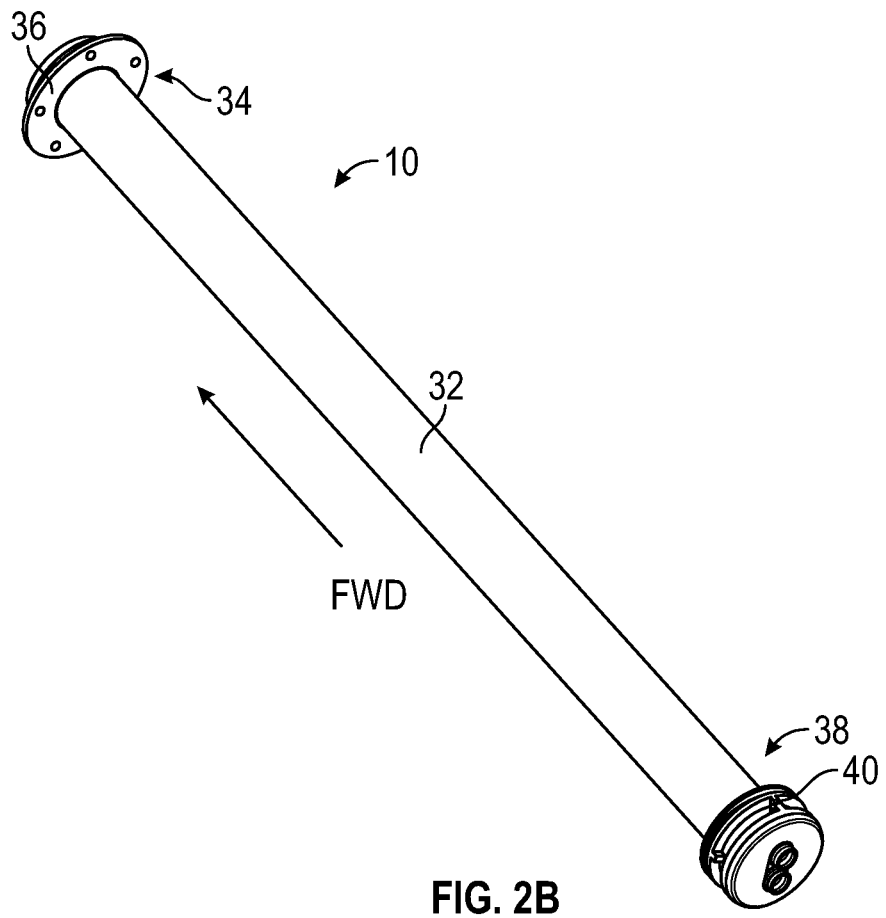
FIG. 2B illustrates the electrical pass-through assembly viewed from an aft end of the aircraft wing, according to an exemplary embodiment.

FIG. 2A illustrates the electrical pass-through assembly 10 when viewed from a forward end 28 of the aircraft wing 8 (FIG. 1) and FIG. 2B is an illustration of the electrical pass-through assembly 10 viewed from the aft end 26 of the aircraft wing 8 (FIG. 1). Referring to FIGS. 1, 2A and 2B the sleeve 32 defines a fixed end 34 and a locked end 38. The electrical pass-through assembly 10 includes a fitting 36 and a locking retainer 40. The fitting 36 is disposed at the fixed end 34 of the sleeve 32, and the locking retainer 40 is securely engaged with the locked end 38 of the sleeve 32. It is to be appreciated that both the fixed end 34 and the locked end 38 of the sleeve 32 are sealed respectively by a first dust seal 46 (seen in FIG. 4) and a second dust seal 48 (seen in FIG. 9) and a first dust cap 50 (seen in FIG. 4) and a second dust cap 52 (seen in FIG. 9).

Figure 3:
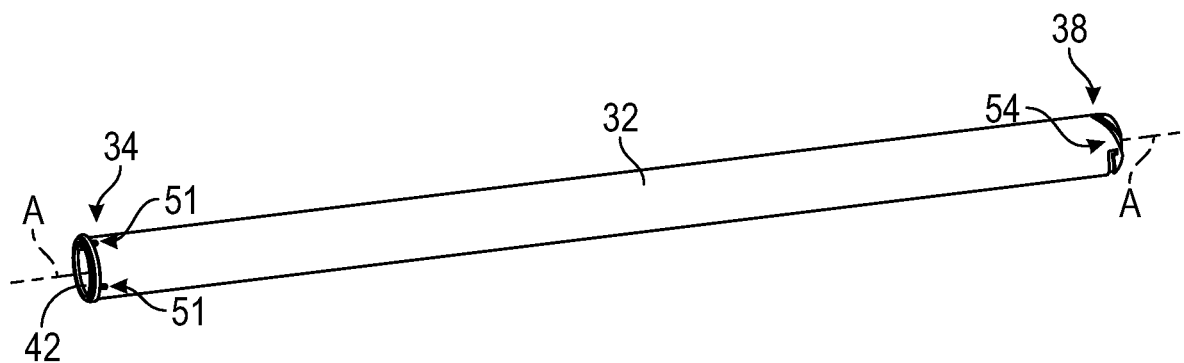
FIG. 3 is a perspective view of a sleeve that is part of the electrical pass-through assembly, according to an exemplary embodiment.

FIG. 3 is a perspective view of the sleeve 32. The sleeve 32 further defines a passage 42 extending between the fixed end 34 and the locked end 38, a mating feature 51 disposed on the fixed end 34, and a locking feature 54 disposed on the locked end 38. The one or more wiring harnesses 30 (seen in FIGS. 1, 12 and 15) are received within the passage 42 of the sleeve 32 and extends along a longitudinal axis A-A of the sleeve 32 through both the fixed end 34 and the locked end 38 of the sleeve 32. As seen in FIG. 1, the sleeve 32 extends lengthwise through the front spar 16 and the rear spar 18 of the aircraft wing 8, therefore routing the wiring harnesses 30 through the aircraft wing 8. In the embodiment as shown in FIG. 3, the sleeve 32 includes a tubular profile, however, it is to be appreciated that the sleeve 32 may include other geometries as well.

Figure 4:
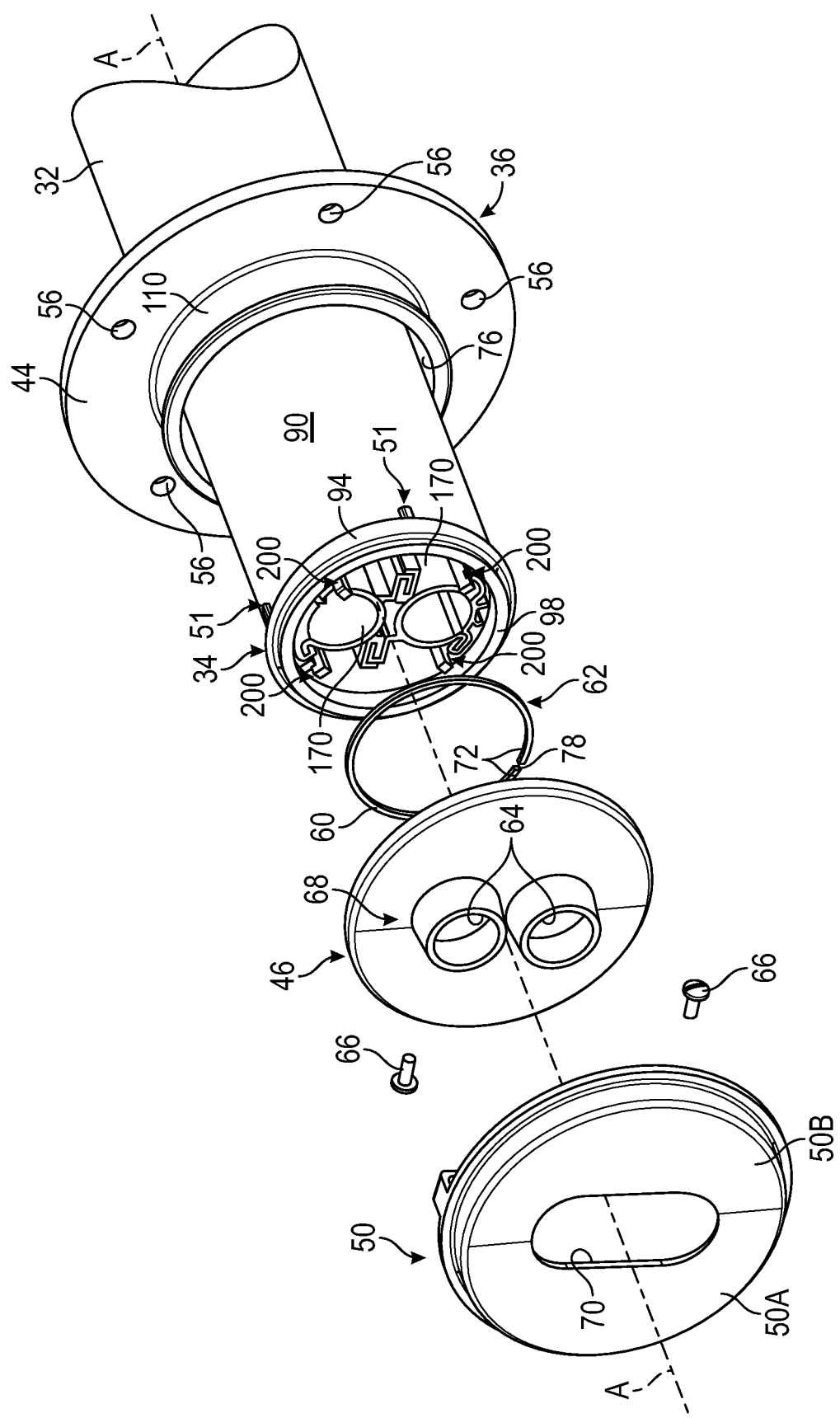
FIG. 4 is an exploded view of a fixed end of the sleeve, according to an exemplary embodiment.

FIG. 4 is an exploded view of the electrical pass-through assembly 10 taken at the fixed end 34 of the sleeve 32 illustrating the fitting 36, a first retaining ring 62, the first dust seal 46, the first dust cap 50, and a pair of fasteners 66. The first dust seal 46 is disposed at the fixed end 34 of the sleeve 32. The first retaining ring is constructed of an elongated member 60 that is not joined at its respective ends 72, thereby defining a split 78. The first retaining ring 62 is secured to the sleeve 32 by a plurality of first retaining features 200 (also seen in FIG. 20) that are part of the sleeve 32 and is described in greater detail below.

The first dust seal 46 includes one or more openings 64 that seal around the one or more wiring harnesses 30 (FIGS. 1 and 12) and is split lengthwise along a center portion 68 to seal around the one or more wiring harnesses 30. The first dust seal 46 and the second dust seal 48 (seen in FIG. 9) substantially prevent debris from entering the sleeve 32, and are constructed of a flexible material such as, for example, rubber. The first dust cap 50 fits over the first dust seal 46 and is split into two separate sections 50A, 50B. The first dust cap 50 may be constructed of plastic and also prevents debris from entering the sleeve 32. As explained in greater detail and shown in FIG. 8, the fasteners 66 are used to secure the separate sections 50A, 50B of the first dust cap 50 to one another. The two separate sections 50A, 50B of the first dust cap 50 define an opening 70 for receiving the one or more wiring harnesses 30.

Figure 5:
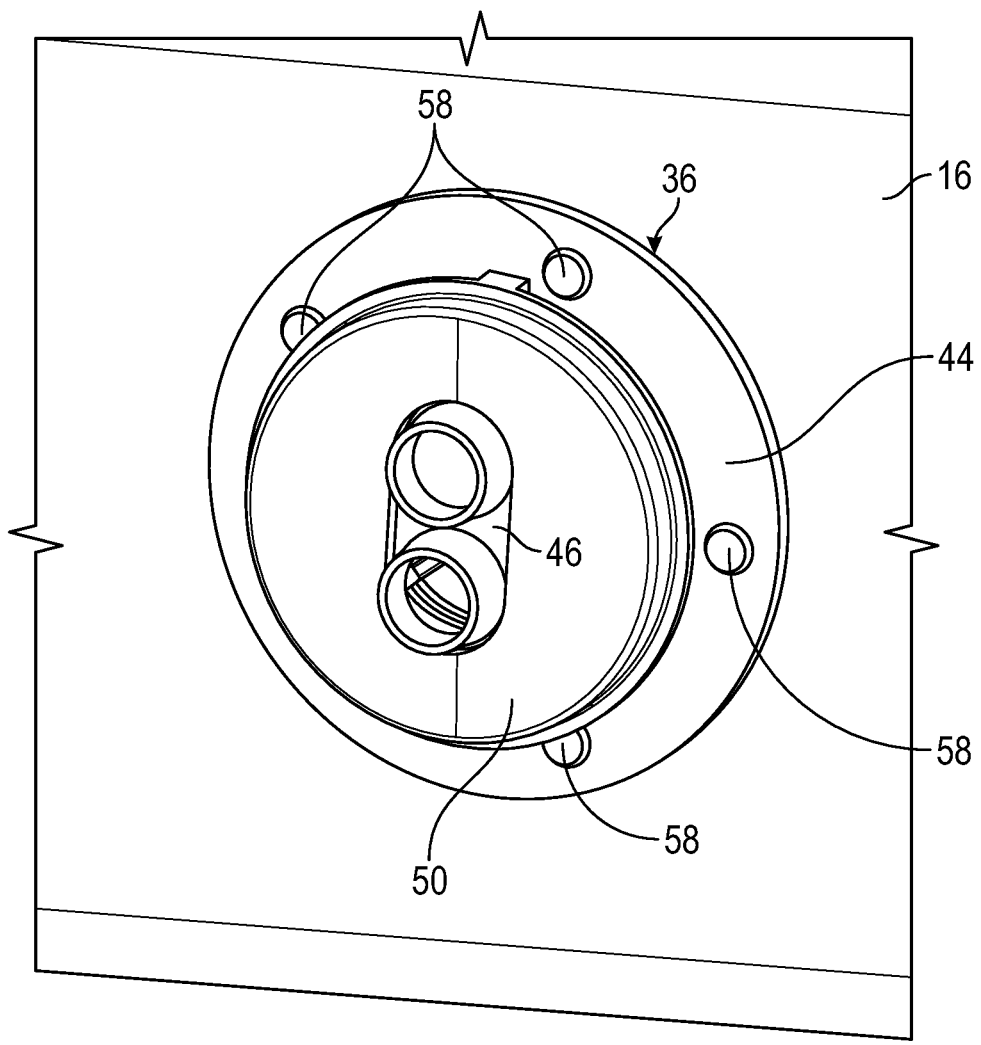
FIG. 5 is an illustration of the electrical pass-through assembly installed to a front spar of the aircraft wing shown in FIG. 1, according to an exemplary embodiment.

FIG. 5 is an illustration of the electrical pass-through assembly 10 viewed at the front spar 16. The fitting 36 is configured to attach the structure 12 (FIG. 1). Specifically, in the embodiment as shown in the figures, the fitting 36 is rigidly attached to the front spar 16 of the aircraft wing 8 by a plurality of fasteners 58 that are received by openings 56 (seen in FIG. 4) disposed around a flange 44 of the fitting 36. Thus, the fixed end 34 of the sleeve 32 is attached to the front spar 16 of the aircraft wing 8. In contrast, the locked end 38 of the sleeve 32 is not rigidly attached to the aircraft wing 8, and therefore is not subjected to the loads caused by thermal expansion and contraction as well as vibrations that are experienced by the aircraft wing 8 during operation. It is to be appreciated that all of the components of the electrical pass-through assembly 10 (i.e., the sleeve 32, the fitting 36, the locking retainer 40, the dust seals 46, 48, the dust caps 50, 52, the retaining rings 62, 124, and the wiring harness sleeves 170) except for the fasteners 66 (FIG. 4) and 126 (FIG. 9) used to secure the dust caps 50, 52 are constructed of non-conductive materials. As a result, attachment between the fitting 36 to the front spar 16 does not require specialized grounding fasteners.

Figure 6:
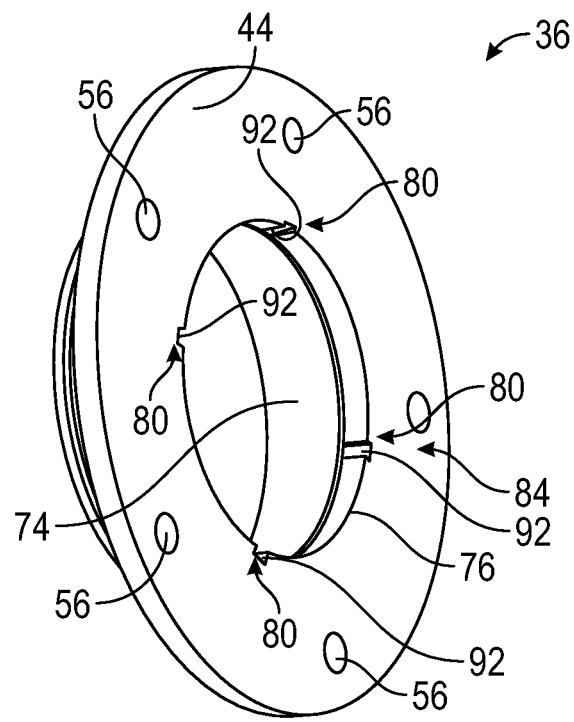
FIG. 6 is a perspective view of a fitting that is part of the electrical pass-through assembly, according to an exemplary embodiment.
Figure 7:
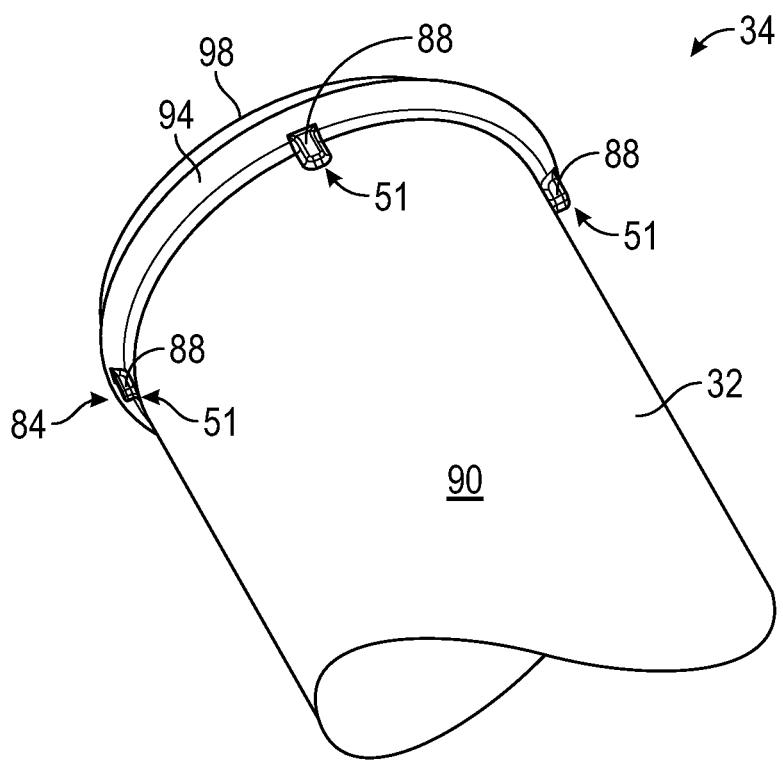
FIG. 7 is an enlarged view of the fixed end of the sleeve, according to an exemplary embodiment.

FIG. 6 is a perspective view of the fitting 36 and FIG. 7 is an enlarged view of the fixed end 34 of the sleeve 32. Referring to FIGS. 6 and 7, the fitting 36 includes an inner surface 74 defining an opening 76. The opening 76 of the fitting 36 is shaped to receive the fixed end 34 of the sleeve 32. A corresponding mating feature 80 is disposed along the inner surface 74 of the fitting 36 and engages with the mating feature 51 disposed at the fixed end 34 of the sleeve 32 to prevent relative rotation between the fitting 36 and the sleeve 32. The fitting 36 is rigidly attached to the structure 12 (i.e., the front spar 16 seen in FIG. 5), which in turn secures the fixed end 34 of the sleeve 32 to the structure 12. As explained below, a lip 94 (FIG. 7) that circumferentially extends around the outer surface 90 of the sleeve 32 allows for the sleeve 32 to move relative to the fitting 36 to account for manufacturing tolerances during assembly.

In the non-limiting embodiment as shown in FIGS. 6-7, the mating feature 51 disposed on the fixed end 34 of the sleeve 32 and the corresponding mating feature 80 disposed along the inner surface 74 of the fitting 36 comprise one or more interlocking tabs 84. Specifically, the one or more interlocking tabs 84 include a plurality of raised tabs 88 disposed along an outer surface 90 of the sleeve 32. In the embodiment as shown in FIG. 7, the sleeve 32 comprises of four raised tabs 88 disposed equidistant from one another. The one or more interlocking tabs 84 further include a plurality of corresponding recessed tabs 92 disposed around the inner surface 74 of the fitting 36, where the corresponding recessed tabs 92 are shaped to engage with the raised tabs 88 disposed around the outer surface 90 of the sleeve 32, thereby preventing relative rotation between the sleeve 32 and the fitting 36. It is to be appreciated that the one or more interlocking tabs 84 shown in FIG. 6-7 are exemplary in nature, and any other type of feature for preventing relative rotation between the sleeve 32 and the fitting 36 may be used as well.

Figure 8:
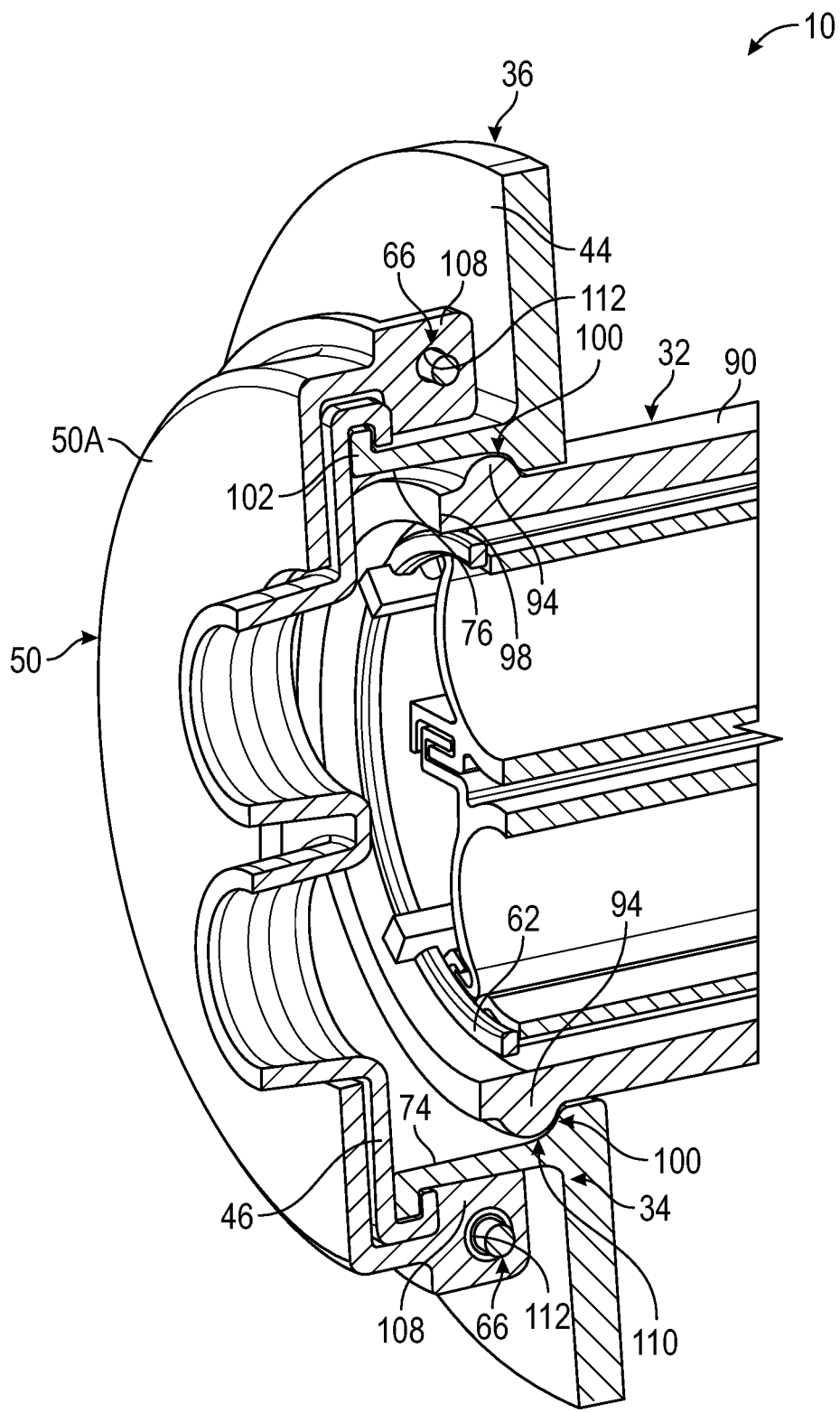
FIG. 8 is a cross-sectioned view of the fixed end of the sleeve, according to an exemplary embodiment.

Referring specifically to FIG. 7, the fixed end 34 of the sleeve 32 includes the lip 94 that circumferentially extends around the outer surface 90 of the sleeve 32. The lip 94 is disposed at an end 98 of the fixed end 34 of the sleeve 32. FIG. 8 is a cross-sectioned view of the fixed end 34 of the sleeve 32. The lip 94 of the sleeve 32 engages with the inner surface 74 of the fitting 36. The interface between the lip 94 and the inner surface 74 of the fitting 36 allows the sleeve 32 to move relative to the rear spar 18 (FIG. 1) during assembly in order to account for manufacturing tolerances between the front spar 16 and the rear spar 18. In the exemplary embodiment as shown, the lip 94 of the sleeve 32 includes a spherical profile 100, however, it is to be appreciated that other geometries may be used as well. In the example as shown in FIG. 8, the interface between the spherical profile 100 of the lip 94 and the inner surface 74 of the fitting 36 allows for manufacturing tolerance misalignment between the front spar 16 and the rear spar 18 (FIG. 1).

Continuing to refer to FIG. 8, the first dust seal 46 is disposed at the end 98 of the fixed end 34 of the sleeve 32 and is engaged with a first lip 102 disposed circumferentially around the opening 76 of the fitting 36. In other words, the first dust seal 46 fits over the first lip 102 disposed around the opening 76 of the fitting 36. The two separate sections 50A, 50B of the first dust cap 50 (only the section 50A is shown in FIG. 8) are installed over the first dust seal 46. Each of the two separate sections 50A, 50B of the first dust cap 50 define a circumferential lip 108. The circumferential lip 108 is received by a circumferential groove 110 disposed around the fitting 36. Each fastener 66 is received by a corresponding opening 112 within the section 50A of the first dust cap 50 and secures the section 50A with the opposing section 50B (seen in FIG. 4) of the first dust cap 50.

Figure 9:
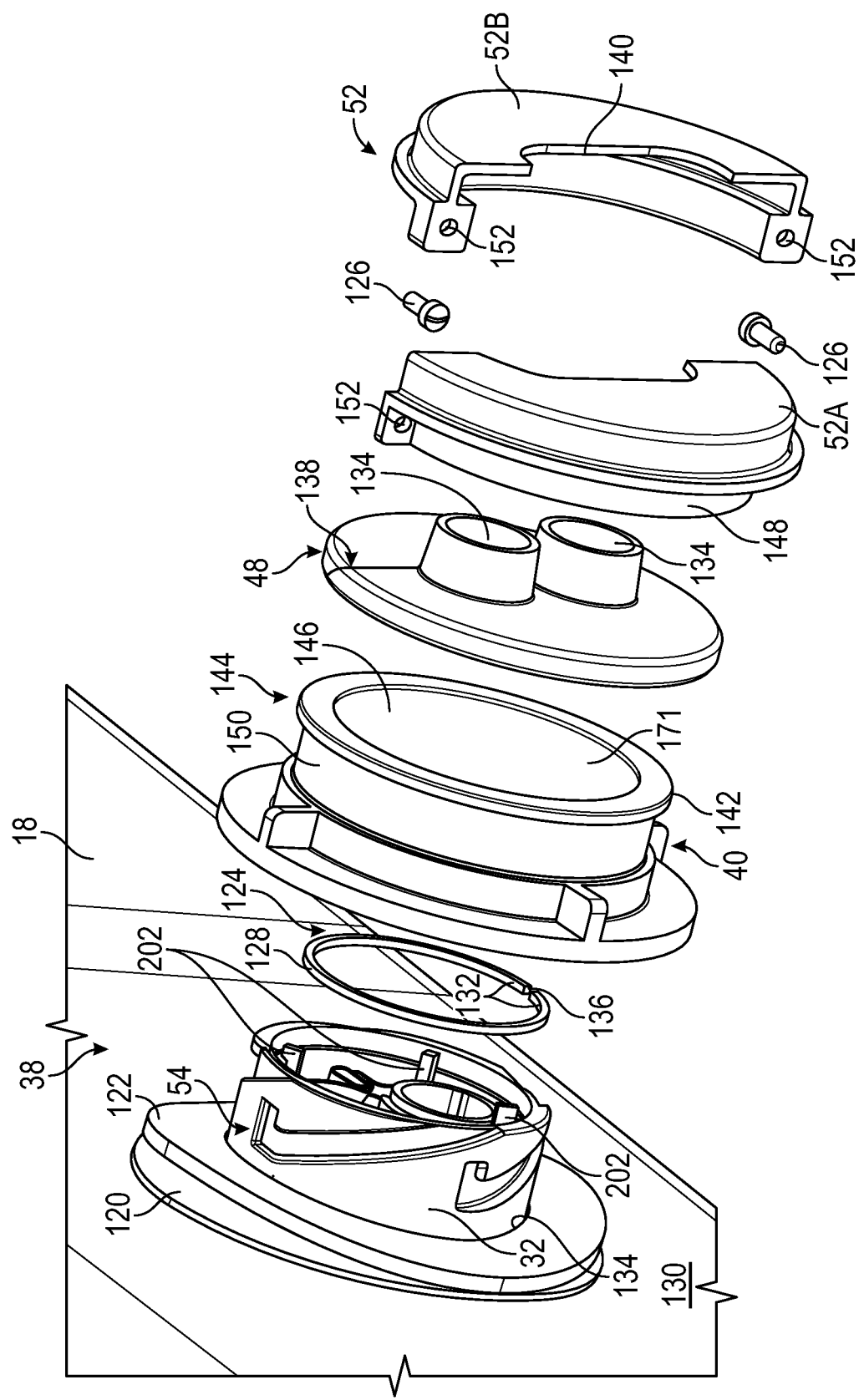
FIG. 9 is an exploded view of a locked end of the sleeve, according to an exemplary embodiment.

FIG. 9 is an exploded view of the locked end 38 of the sleeve 32, where the electrical pass-through assembly 10 includes a sealing washer 120, a tensioning member 122, a second retaining ring 124, the locking retainer 40, the second dust seal 48, and the second dust cap 52, and a pair of fasteners 126. In the embodiment as shown in FIG. 9, the locked end 38 of the sleeve 32 is received by an opening (not visible) in the rear spar 18. The sealing washer 120 includes an opening (not visible) that is received by the locked end 38 of the sleeve 32. The sealing washer 120 is an anti-friction sealing washer that is disposed directly adjacent to an outer surface 130 of the rear spar 18. The sealing washer 120 acts as a physical barrier that protects the outer surface 130 of the rear spar 18 from abrasions that may occur when the tensioning member 122 vibrates during flight. The tensioning member 122 defines an opening 134 that is received by the locked end 38 of the sleeve 32 and is placed between the sealing washer 120 and the locking retainer 40. In the embodiment as shown in FIG. 9, the tensioning member 122 is a spring washer or a wave washer.

Similar to the first retaining ring 62 seen in FIG. 4, the second retaining ring 124 is constructed of an elongated member 128 that is not joined at its respective ends 132, thereby creating a split 136. The second retaining ring 124 is secured to the sleeve 32 by a plurality of second retaining features 202 that are part of the sleeve 32 and is described in greater detail below. The second dust seal 48 is disposed on the locking retainer 40 of the sleeve 32. The second dust seal 48 includes one or more openings 134 that seal around the one or more wiring harnesses 30 (FIG. 1) and is split lengthwise along a center portion 138 to seal around the one or more wiring harnesses 30. The second dust cap 52 fits over the second dust seal 48 and is split into two separate sections 52A, 52B. Similar to the first dust cap 50, the second dust cap 52 is also constructed of plastic and prevents debris from entering the sleeve 32. The two separate sections 52A, 52B of the second dust cap 52 define an opening 140 for receiving the one or more wiring harnesses 30.

The second dust seal 48 is disposed at an end 144 of the locking retainer 40 and is engaged with a second lip 142 disposed circumferentially around an opening 146 defined by the locking retainer 40. The two separate sections 52A, 52B of the second dust cap 52 are installed over the second dust seal 48. Each of the two separate sections 52A, 52B of the second dust cap 52 define a circumferential lip 148. The circumferential lip 148 is received by a circumferential groove 150 disposed around the locking retainer 40. Each fastener 126 is received by a corresponding opening 152 within the sections 52A, 52B of the second dust cap 52 to secure the sections 52A, 52B to one another.

Figure 10:
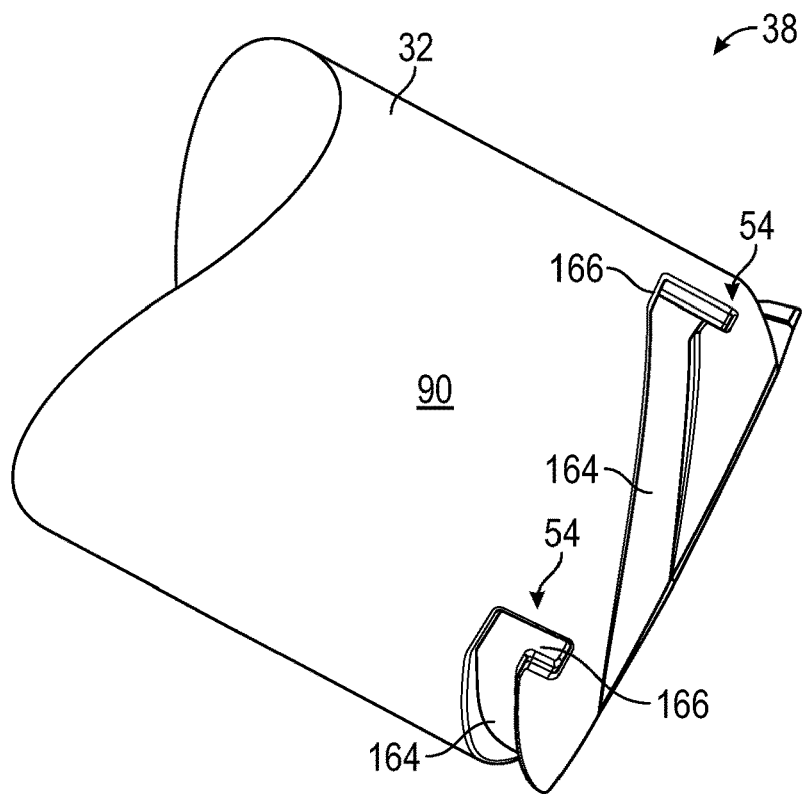
FIG. 10 is an enlarged view of the locked end of the sleeve, according to an exemplary embodiment.
Figure 11:
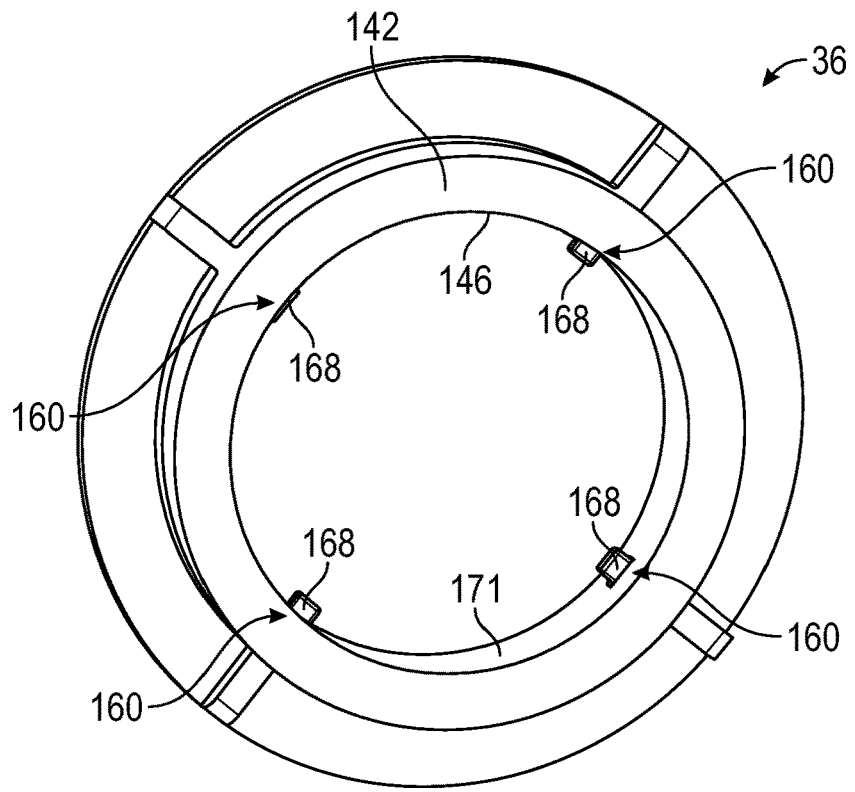
FIG. 11 illustrates a locking retainer that is engaged with the locked end of the sleeve shown in FIG. 10, according to an exemplary embodiment.

FIG. 10 is an enlarged view of the locked end 38 of the sleeve 32 and FIG. 11 illustrates the locking retainer 40. Referring to FIGS. 10 and 11, the locking retainer 40 is securely engaged with the locked end 38 of the sleeve 32. An inner surface 171 of the locking retainer 40 defines the opening 146. The opening 146 of the locking retainer 40 is shaped to receive the locked end 38 of the sleeve 32. The locking retainer 40 includes a corresponding locking feature 160 disposed around the inner surface 171 of the opening 146 that securely engages with the locking feature 54 disposed at the locked end 38 of the sleeve 32.

In the exemplary embodiment as shown in FIG. 10, the locking feature 54 disposed on the locked end 38 of the sleeve 32 includes one or more ramped grooves 164 that extend around the outer surface 90 of the sleeve 32 and terminate at a corresponding end stop 166. Referring to FIG. 11, the corresponding locking feature 160 of the locking retainer 40 includes one or more raised posts 168 disposed around the inner surface 171 of the opening 146, where each raised post 168 is configured to lockingly engage with a corresponding end stop 166 of one of the ramped grooves 164. When the raised posts 168 of the locking retainer 40 are engaged with the corresponding end stops 166 disposed on the sleeve 32, the locking retainer 40 is securely engaged with the locked end 38 of the sleeve 32. The tensioning member 122 (seen in FIG. 9) is configured to provide tension between the locking retainer 40 and the structure 12. The tensioning member 122 ensures the locking retainer 40 stays engaged with the locked end 38 of the sleeve 32 when the electrical pass-through assembly 10 is exposed to vibration and thermal expansion.

In the non-limiting embodiment as shown in FIGS. 10 and 11, the locked end 38 of the sleeve 32 includes four ramped grooves 164 spaced equidistant from one another, and the locking retainer 40 includes four corresponding raised posts 168 spaced equidistant from one another. It is to be appreciated that the locking feature 54 disposed on the sleeve 32 shown in FIG. 10 and the corresponding locking feature 160 disposed on the locking retainer 40 shown in FIG. 11 are exemplary in nature, and any other type of feature for secure engagement between the sleeve 32 and the locking retainer 40 may be used as well.

Figure 12:
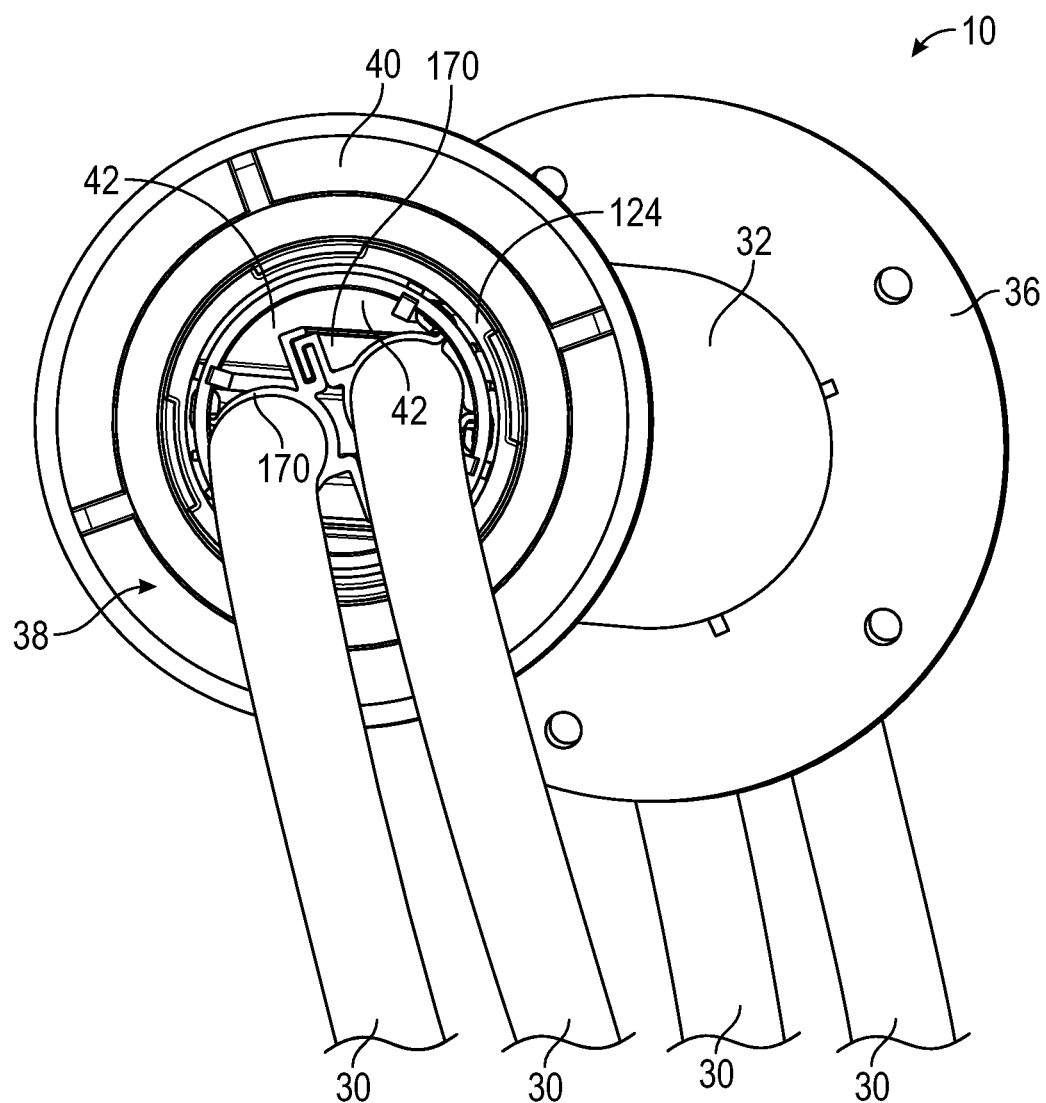
FIG. 12 illustrates the electrical pass-through assembly when viewed from the locked end, where a second dust seal and a second dust cap have been removed, according to an exemplary embodiment.

FIG. 12 illustrates the electrical pass-through assembly 10 when viewed from the locked end 38, where the second dust seal 48 and the second dust cap 52 (FIG. 9) have been removed. The electrical pass-through assembly 10 further includes one or more wiring harness sleeves 170 that are contained inside the passage 42 of the sleeve 32. Each wiring harness sleeve 170 includes a passageway 172 (FIGS. 13 and 14) configured to contain a corresponding wiring harness 30. In the embodiment as shown in FIG. 12, two wiring harness sleeves 170 are disposed within the sleeve 32, however, it is to be appreciated that fewer or more wiring harness sleeves 170 may be included as part of the electrical pass-through assembly 10 depending upon the application.

Figure 13:
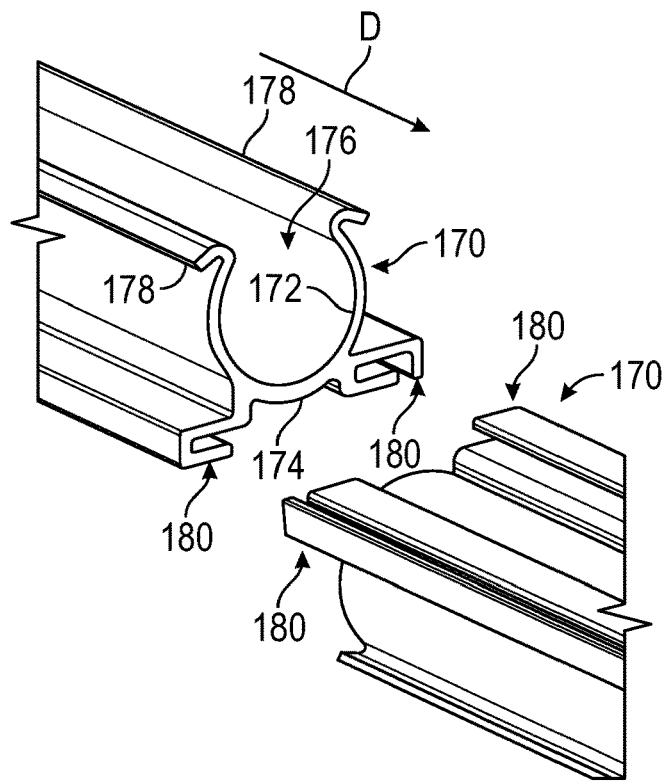
FIG. 13 illustrates two wiring harness sleeves before they are interlocked together, according to an exemplary embodiment.
Figure 14:
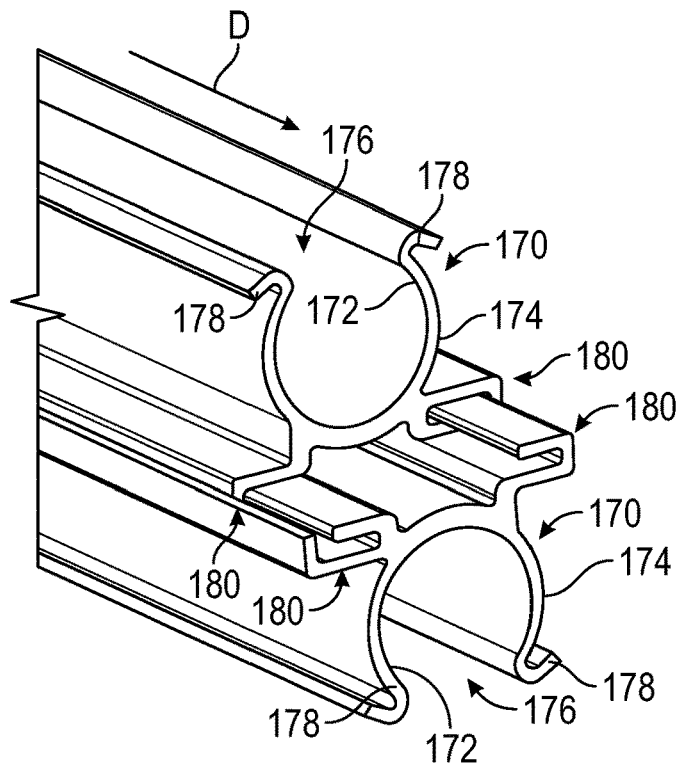
FIG. 14 illustrates the wiring harness sleeves after they are interlocked to one another, according to an exemplary embodiment.

The two wiring harness sleeves 170 are secured within the sleeve 32 of the electrical pass-through assembly 10 and are interlocked with one another. FIG. 13 illustrates the two wiring harness sleeves 170 before they are interlocked together, and FIG. 14 illustrates the wiring harness sleeves 170 interlocked to one another during assembly. In the embodiment as shown in FIGS. 12, 13, and 14, the one or more wiring harness sleeves 170 include of a pair of identical wiring harness sleeves 170 that interlock with one another. Each passageway 172 of the wiring harness sleeves 170 includes a rounded profile 174, an open top 176, and a pair of longitudinally extending hooks 178. Each wiring harness sleeve 170 also includes a pair of longitudinally extending tabs 180 disposed opposite to the passageway 172. As seen in FIGS. 13 and 14, one of the wiring harness sleeves 170 is translated in a longitudinal direction D such that the longitudinally extending tabs 180 slidingly engage and interlock with the longitudinally extending tabs 180 disposed on the remaining wiring harness sleeve 170.

Figure 15:
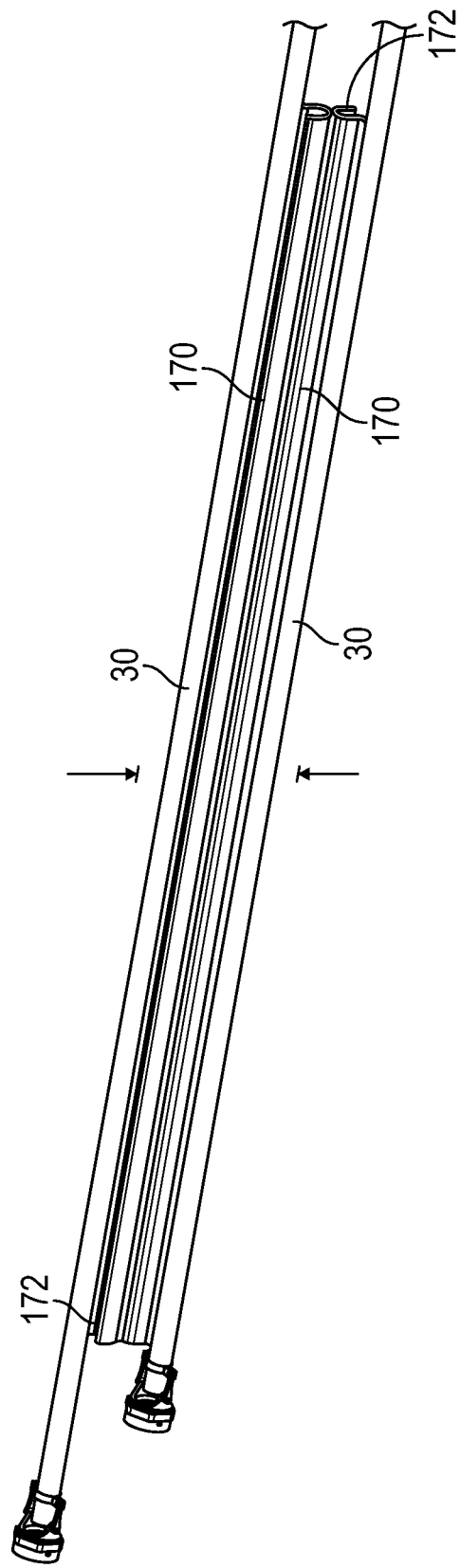
FIG. 15 illustrates two wiring harnesses being installed within the wiring harness sleeves, according to an exemplary embodiment.
Figure 16:
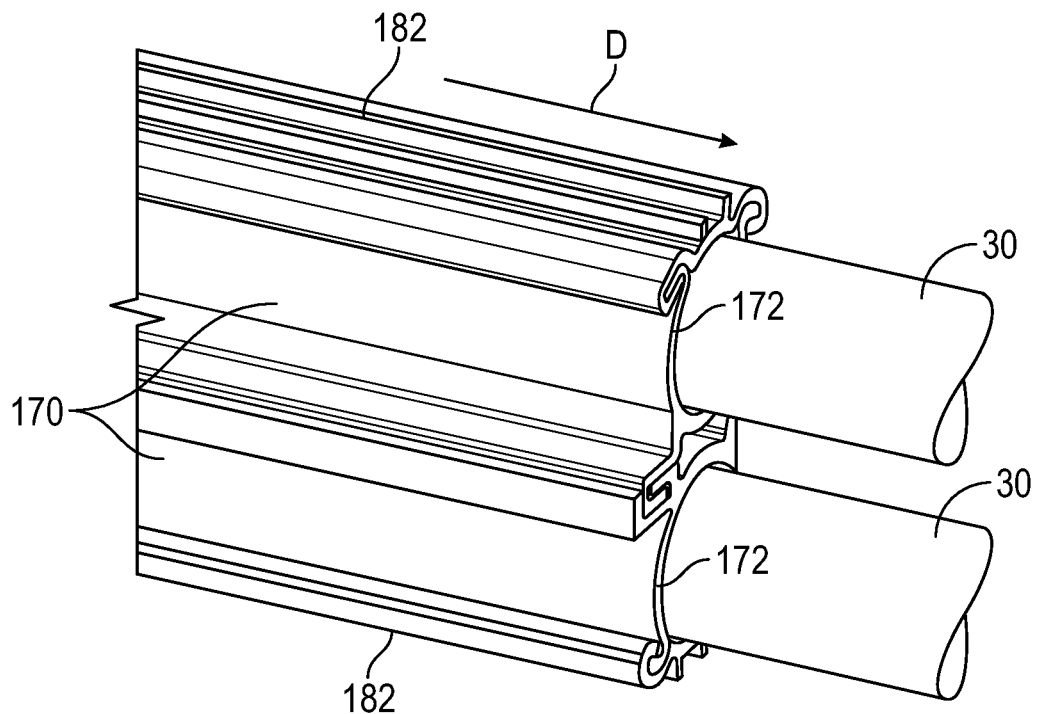
FIG. 16 illustrates a sleeve lock being installed to the wiring harness sleeves, according to an exemplary embodiment.
Figure 17:
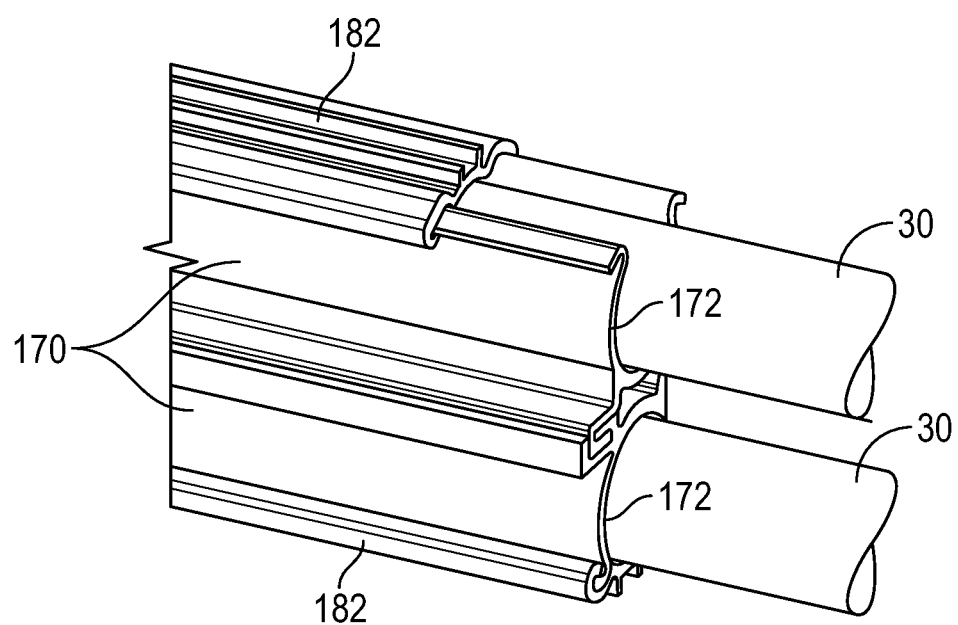
FIG. 17 illustrates the sleeve lock after being installed to the wiring harness sleeves, according to an exemplary embodiment.
Figure 18:
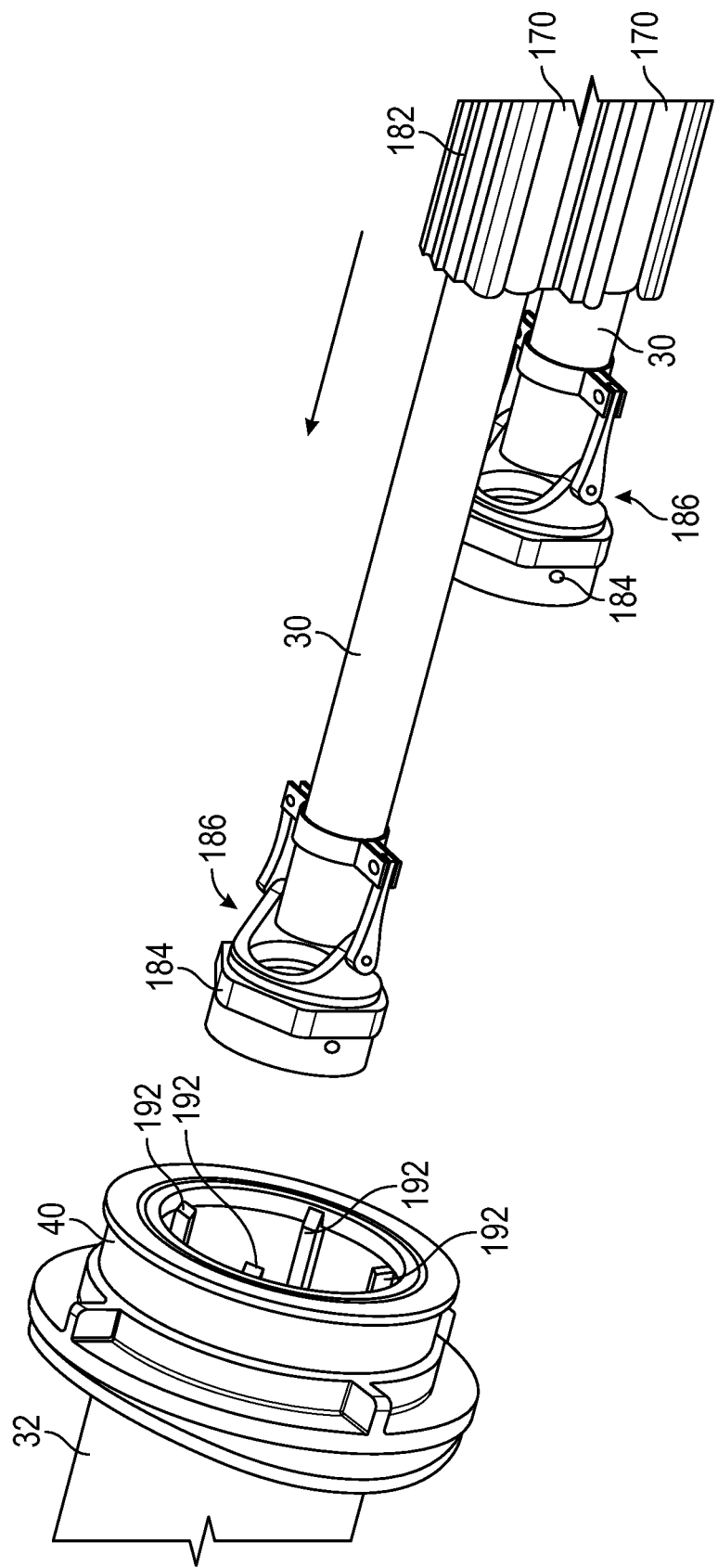
FIG. 18 illustrates the wiring harness sleeves being inserted into the sleeve of the electrical pass-through assembly, according to an exemplary embodiment.

Turning to FIG. 15, once the wiring harness sleeves 170 interlock with one another, a corresponding wiring harness 30 is placed within the passageway 172 of each of the one or more wiring harness sleeves 170. Referring to FIG. 16 and FIG. 17, once the wiring harnesses 30 are placed within their respective passageways 172, a sleeve lock 182 is slid in the longitudinal direction D over the passageway 172 of each of the one or more wiring harness sleeves 170. The sleeve lock 182 is configured to retain the wiring harness 30 within the respective passageway 172 of the wiring harness sleeve 170. Referring to FIG. 18, a connector 184 is placed on each end 186 of the wiring harnesses 30 (only one end is shown in FIG. 18), and the wiring harnesses 30 are then slid through the sleeve 32.

Figure 19:
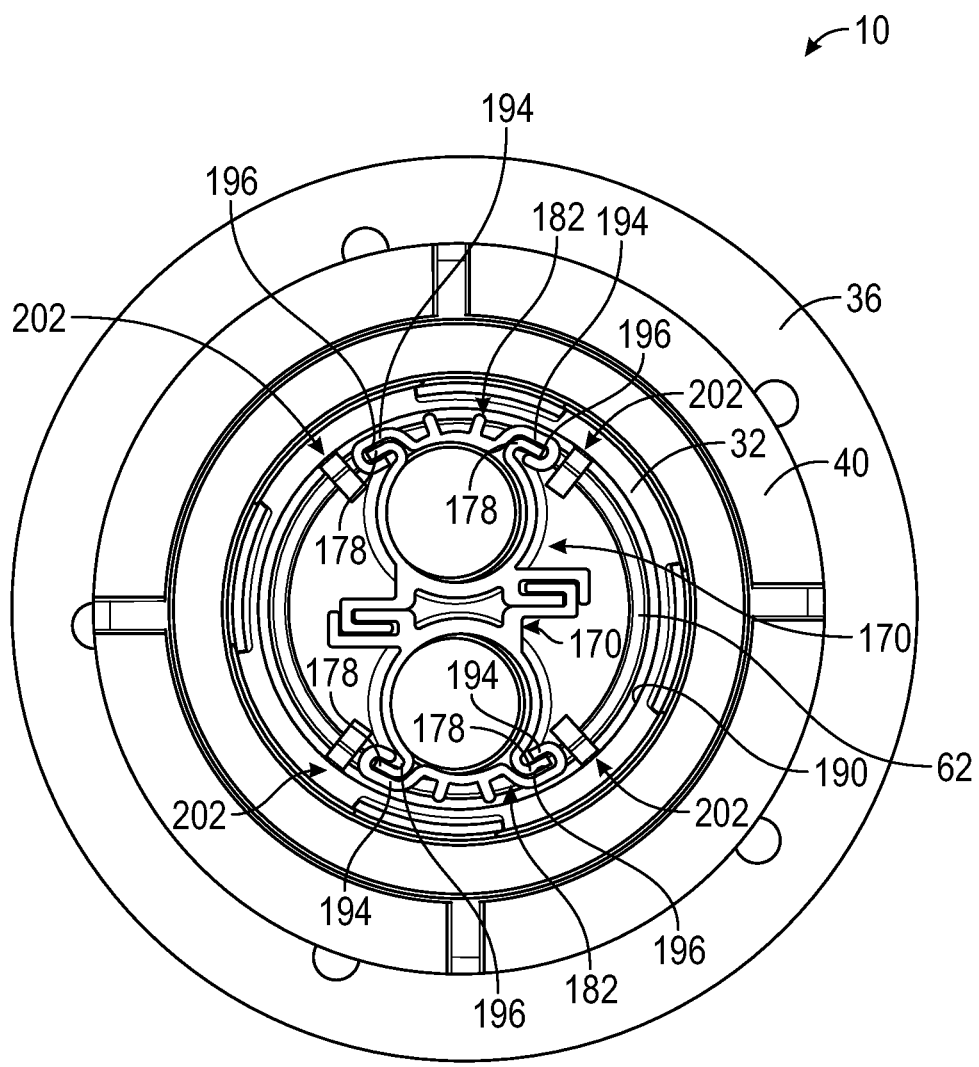
FIG. 19 illustrates the electrical pass-through assembly when viewed from the locked end, according to an exemplary embodiment.
Figure 20:
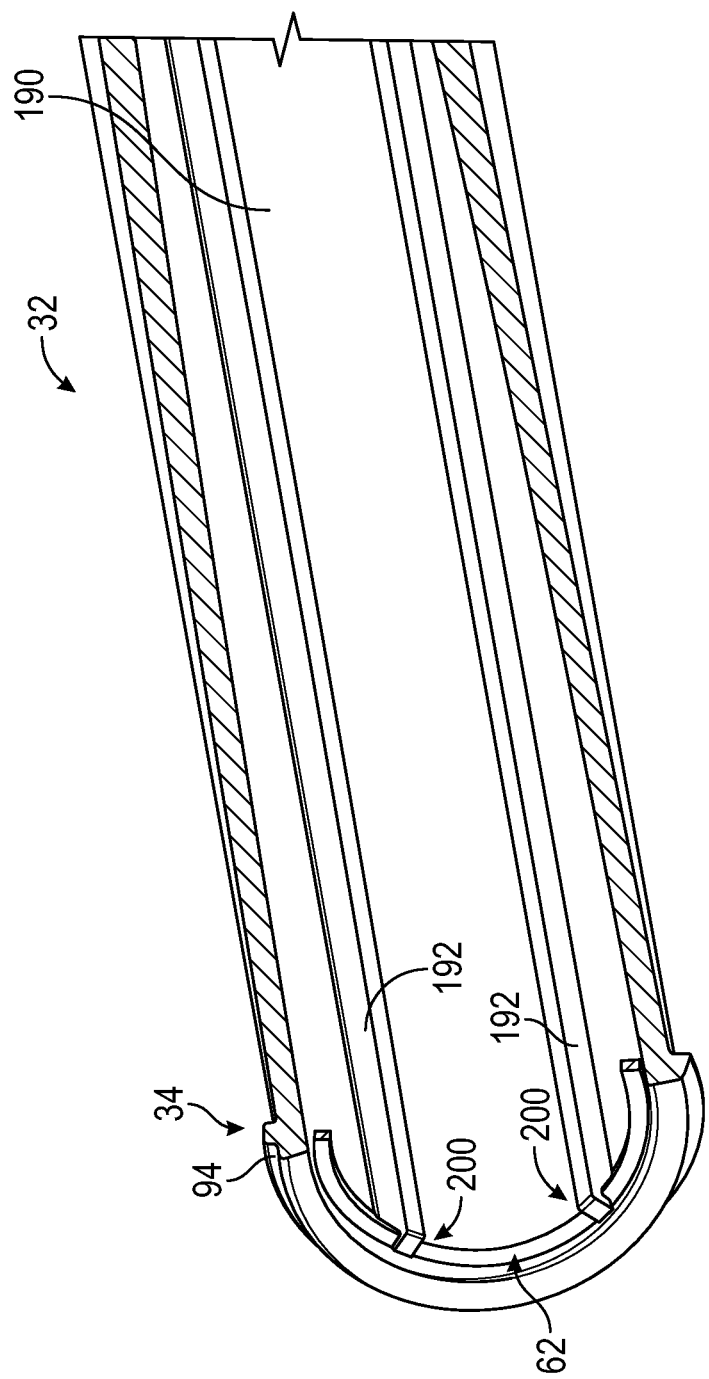
FIG. 20 is a longitudinal cross-sectioned view of the sleeve, according to an exemplary embodiment.

FIG. 19 illustrates the electrical pass-through assembly 10 when viewed from the locked end 38 of the sleeve 32, where the second dust seal 48, the second dust cap 52, the second retaining ring 124 (FIG. 9), and the wiring harnesses 30 have been removed (the first retaining ring 62 disposed on the fixed end 34 of the sleeve 32 is still visible). FIG. 20 is a longitudinal cross-sectioned view of the sleeve 32, where an inner surface 190 of the sleeve 32. Referring to FIG. 20, the sleeve 32 includes one or more pairs of blades 192 that extend longitudinally along the inner surface 190 of the sleeve 32. Each pair of blades 192 corresponds to one of the wiring harness sleeves 170. Thus, in the example as shown in FIGS. 19 and 20, the sleeve 32 includes two pairs of blades 192 (only one pair of blades 192 is visible in FIG. 20). As seen in FIG. 19, each sleeve lock 182 is engaged between one of the pairs of blades 192, where engagement of the sleeve lock 182 between the two blades 192 prevents relative rotation between the respective wiring harness sleeve 170 and the sleeve 32. Specifically, each sleeve lock 182 includes a pair of longitudinally extending curved ribs 194 that are disposed between a corresponding pair of blades 192 of the sleeve 32. Each curved rib 194 also defines a longitudinally extending channel 196 that is shaped to receive one of the longitudinally extending hooks 178 of the corresponding wiring harness sleeves 170.

Figure 22:
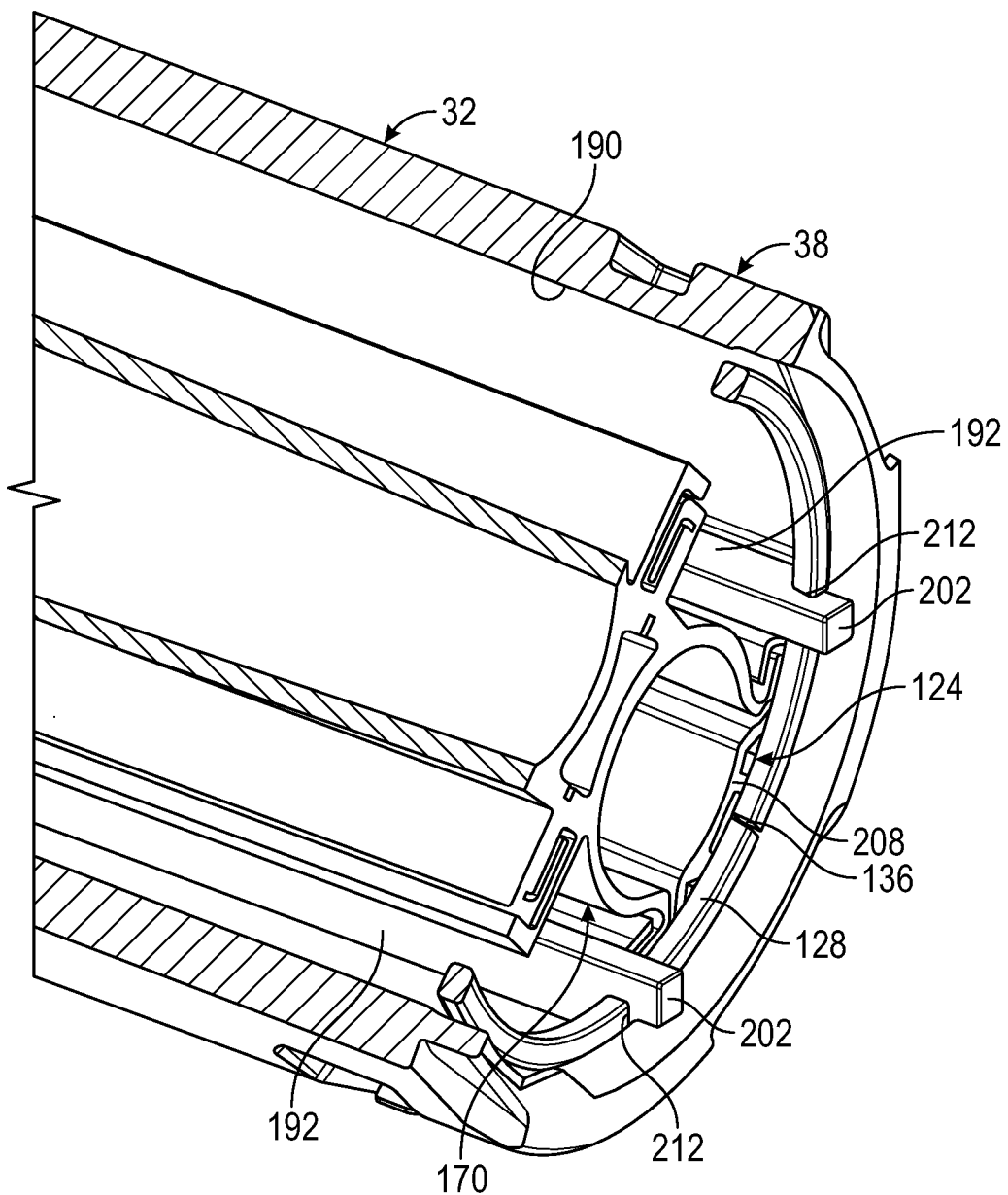
FIG. 22 is an enlarged view of the locked end of the sleeve, according to an exemplary embodiment.

Referring specifically to FIG. 20, each blade 192 of the one or more pairs of blades 192 includes a first retaining feature 200 disposed at the fixed end 34 of the sleeve 32. In the exemplary embodiment as shown, the first retaining feature 200 is a recess 210 shaped to receive a portion of the elongated member 60 of the first retaining ring 62. Likewise, as seen in FIG. 22, each blade 192 also includes a second retaining feature 202 disposed at the locked end 38 of the sleeve 32, where the retaining feature 202 is a recess 212 shaped to receive a portion of the elongated member 128 of the second retaining ring 124.

Figure 21:
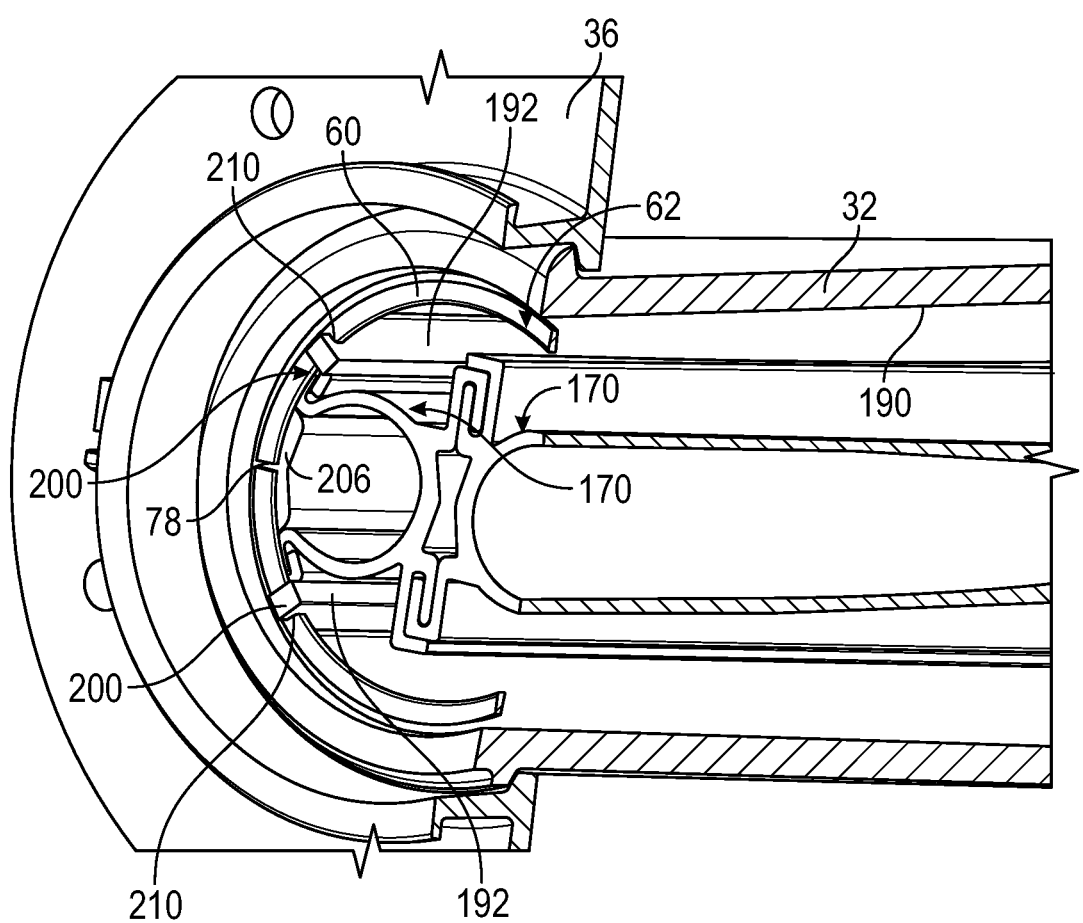
FIG. 21 is an enlarged view of the fixed end of the sleeve, according to an exemplary embodiment.

Referring to FIG. 21, the first retaining ring 62 is secured by the first retaining feature 200 of each blade 192 (only two of the blades 192 are visible in FIG. 20). The first retaining ring 62 abuts against a first end surface 206 of the one or more wiring harness sleeves 170 to prevent translational movement of the one or more wiring harness sleeves 170 within the sleeve 32. Similarly, as seen in FIG. 22, the second retaining ring 124 engages with the second retaining feature 202 of each blade 192. The second retaining ring 124 abuts against a second end surface 208 of the one or more wiring harness sleeves 170 to prevent translational movement of the one or more wiring harness sleeves 170 within the sleeve 32.

In another aspect, a method of installing an electrical pass-through assembly 20 that traverses a structure 12 is provided.

Within examples, the method of installing an electrical pass-through assembly 20 that traverses a structure 12 includes attaching a fitting 36 to the structure 12, wherein the fitting 36 includes an inner surface 74 defining an opening 76; inserting a sleeve 32 within the opening 76 of the fitting 36, wherein the sleeve 32 includes a fixed end 34, a locked end 38, a passage 42 extending between the fixed end 34 and the locked end 38, a mating feature 51 disposed on the fixed end 34, and a locking feature 54 disposed on the locked end 38; engaging the mating feature 51 disposed on the fixed end 34 of the sleeve 32 with a corresponding mating feature 80 disposed along the inner surface 74 of the fitting 36 to prevent relative rotation between the fitting 36 and the sleeve 32; securely engaging the locking feature 54 disposed on the locked end 38 of the sleeve 32 with a corresponding locking feature 160 that is part of a locking retainer 40; and sliding one or more wiring harness sleeves 170 through the sleeve 32, wherein the one or more wiring harness sleeves 170 extend along a longitudinal axis of the sleeve 32 and extend through both the fixed end 34 and the locked end 38.

Figure 23A:
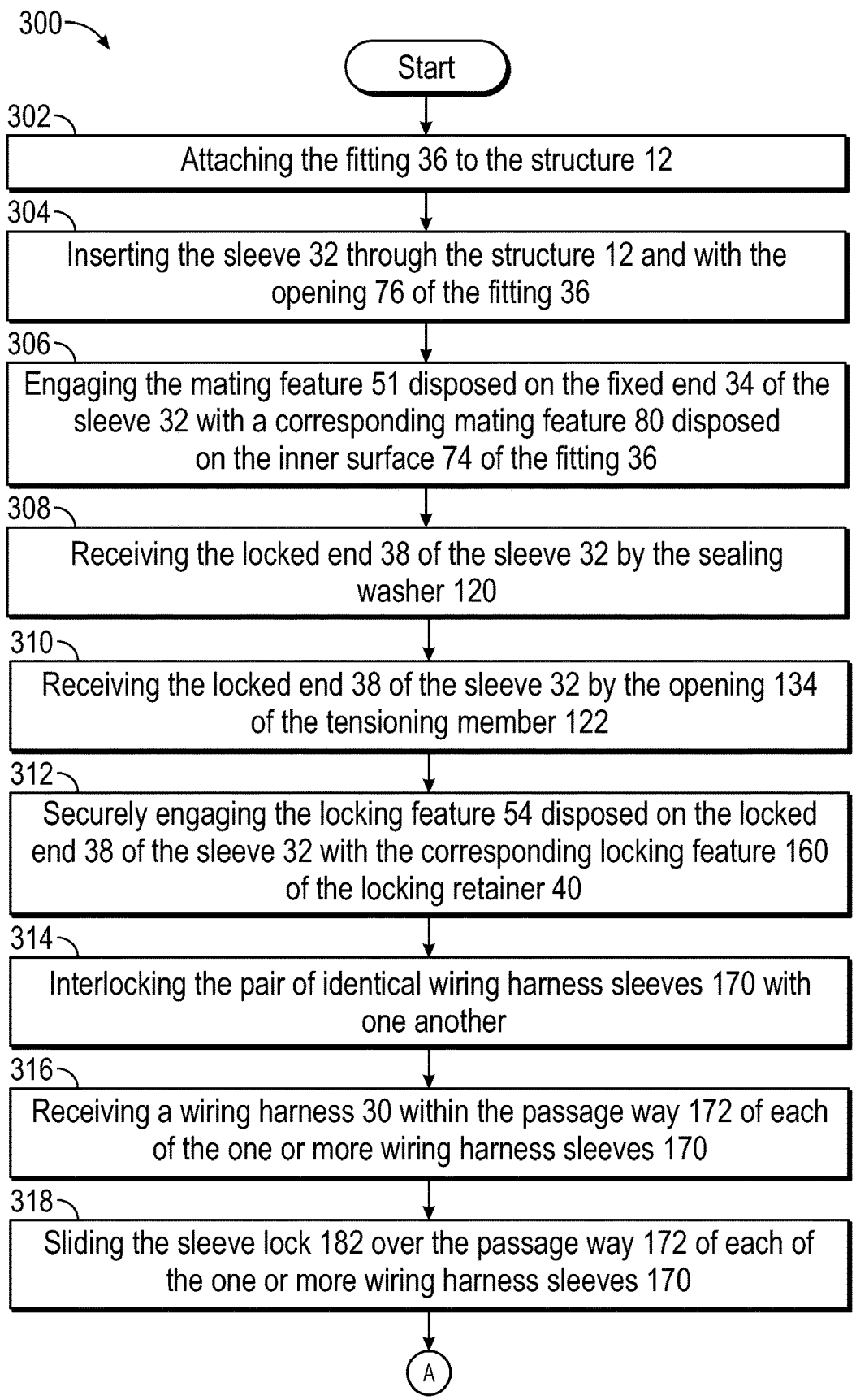
FIGS. 23A-23B illustrates a process flow diagram illustrating a method for installing the electrical pass-through assembly, according to an exemplary embodiment.
Figure 23B:
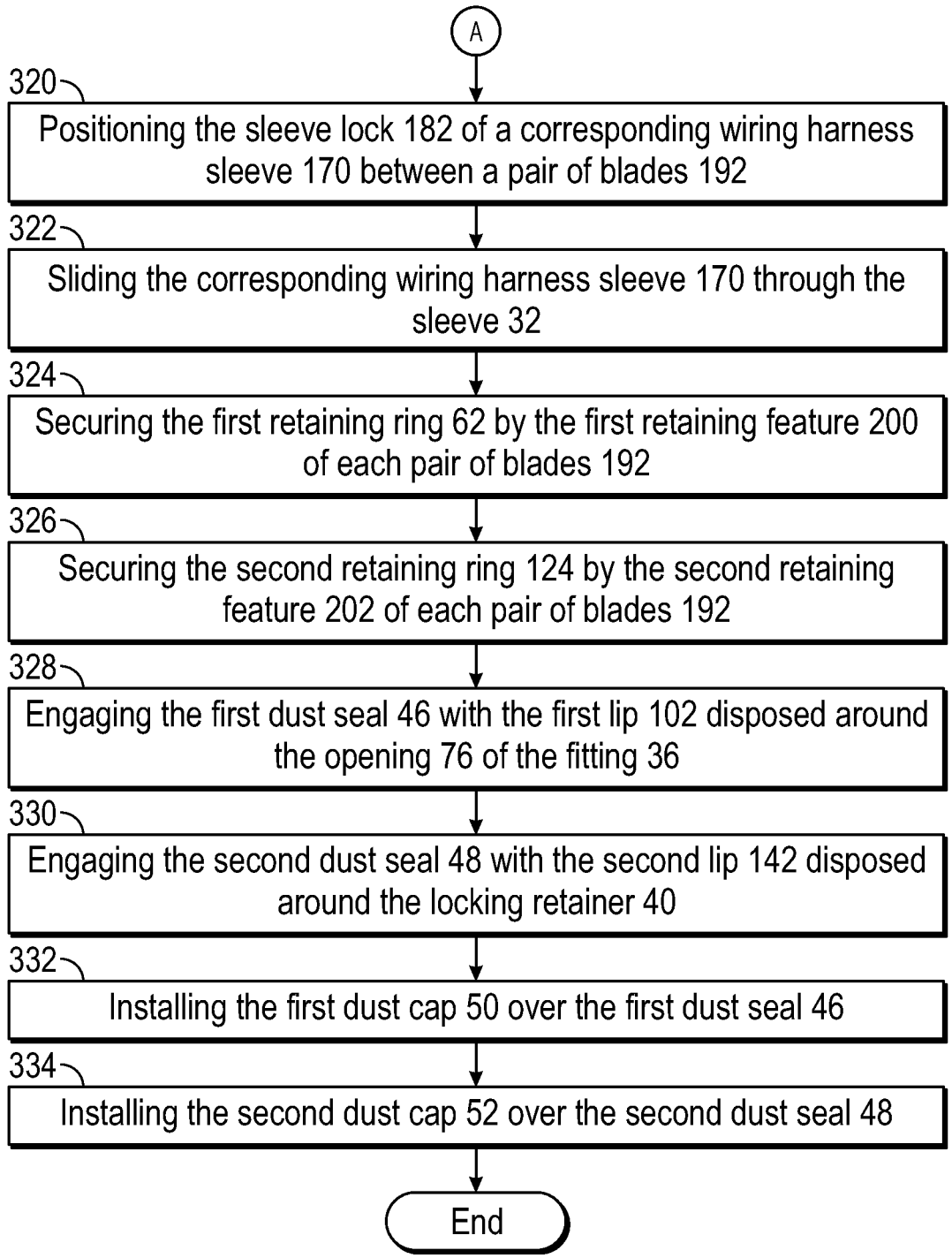

FIGS. 23A-23B illustrate a process flow diagram illustrating an exemplary method for installing the electrical pass-through assembly 10 that traverses the structure 12 (shown in FIG. 1). Although the steps of the method are described as taking place according to a certain sequence, the described steps may also be performed in another order than the order described herein. It is further understood that certain steps may be performed concurrently, other steps added, or certain steps described herein omitted. Indeed, the descriptions of systems and processes in the present specification are provided for the purpose of illustrating certain embodiments and should in no way be interpreted to limit the subject matter disclosed. Referring now to FIGS. 1, 5, and 23, method 300 begins at block 302. In block 302, the fitting 36 is attached to the structure 12. In the exemplary embodiment as shown in the figures, the structure 12 is the aircraft wing 8, and the fitting 36 is attached to the front spar 16 of the aircraft wing 8 by the plurality of fasteners 58 (seen in FIG. 5). The method 300 may then proceed to block 304.

Referring to FIGS. 1, 3, 6, and 23, in block 304 the sleeve 32 is inserted through the structure 12 and within the opening 76 of the fitting 36 (FIG. 6). In the embodiment as shown, the structure 12 is the aircraft wing 8, and the sleeve 32 is received by openings (not visible in the figures) in the front spar 16 and the rear spar 18. The method 300 may then proceed to block 306.

Referring to FIGS. 6, 7, and 23, in block 306 the mating feature 51 disposed on the fixed end 34 of the sleeve 32 engages with a corresponding mating feature 80 disposed along the inner surface 74 of the fitting 36 to prevent relative rotation between the fitting 36 and the sleeve 32. The method 300 may then proceed to block 308.

Referring to FIGS. 9 and 23, in block 308 the locked end 38 of the sleeve 32 is received by an opening (not visible in FIG. 9) of the sealing washer 120. The method 300 may then proceed to block 310.

In block 310, the locked end 38 of the sleeve 32 is received by the opening 134 of the tensioning member 122. The method 300 may then proceed to block 312.

Referring to FIGS. 10, 11, and 23, in block 312 the locking feature 54 disposed on the locked end 38 of the sleeve 32 securely engages with the corresponding locking feature 160 of the locking retainer 40. The method 300 may then proceed to block 314.

Referring to FIGS. 13-14 and 23, in block 314 the pair of identical wiring harness sleeves 170 are interlocked with one another. Specifically, one of the wiring harness sleeves 170 is translated in the longitudinal direction D such that the longitudinally extending tabs 180 slidingly engage and interlock with the longitudinally extending tabs 180 disposed on the remaining wiring harness sleeve 170. The method 300 may then proceed to block 316.

Referring to FIGS. 15 and 23, in block 316 a wiring harness 30 is received within the passageway 172 of each of the one or more wiring harness sleeves 170. The method 300 may then proceed to block 318.

Referring to FIGS. 16, 17, and 23, in block 318 the sleeve lock 182 is slid over the passageway 172 of each of the one or more wiring harness sleeves 170. The method 300 may then proceed to block 320.

Referring to FIGS. 18, 19, 20, and 23, in block 320 the sleeve lock 182 of a corresponding wiring harness sleeve 170 is positioned between a pair of blades 192 that extend longitudinally along an inner surface 190 of the sleeve 32. The method 300 may then proceed to block 322.

In block 322, the corresponding wiring harness sleeve 170 is slid through the sleeve 32, where the one or more wiring harness sleeves 170 extend along the longitudinal axis of the sleeve 32 and extend through both the fixed end 34 and the locked end 38. The sleeve lock 182 is engaged between the pair of blades 192 to prevent relative rotation between the wiring harness sleeve 170 and the sleeve 32. The method 300 may then proceed to block 324.

Referring to FIGS. 21 and 23, in block 324 the first retaining ring 62 is secured by the first retaining feature 200 of each pair of blades 192. The method 300 may then proceed to block 326.

Referring to FIGS. 22 and 23, in block 326 the second retaining ring 124 is secured by the second retaining feature 202 of each pair of blades. The method 300 may then proceed to block 328.

Referring to FIGS. 4, 8, and 23, in block 328 the first dust seal 46 engaged with the first lip 102 disposed around the opening 76 of the fitting 36. The method 300 may then proceed to block 330.

Referring to FIGS. 9 and 23, in block 330 the second dust seal 48 engages with the second lip 142 disposed around the locking retainer 40. The method 300 may then proceed to block 332.

Referring to FIGS. 4, 8, and 23, in block 332 the first dust cap 50 is installed over the first dust seal 46, and the two separate sections 50A, 50B are secured to one another by the fasteners 66. The method 300 may then proceed to block 334.

Referring to FIGS. 9 and 23, in block 334 the second dust cap 52 is installed over the second dust seal 48, and the two separate sections 52A, 52B are secured to one another by the fasteners 126. The method 300 may then terminate.

Referring generally to the figures, the disclosed electrical pass-through assembly provides various technical effects and benefits. Specifically, the electrical pass-through assembly is capable of securing multiple wiring harness in place without using clamps. Moreover, the pass-through assembly either prevents or limits the wiring harnesses from rotating or translating during flight. Since disclosed electrical pass-through assembly includes a fixed end that is attached to the aircraft wing and a locked end that is not rigidly attached to the aircraft wing, the sleeve is not subjected to loads caused by the thermal expansion and contraction as well as vibrations. The disclosed electrical pass-through assembly also provides two layers of protection to the wiring harnesses, which are the sleeve and the wiring harness sleeves. The electrical-pass through assembly enables wiring to be installed in confined areas that can potentially comprise volatile liquid or gases (e.g., fuel vapor). For example, the disclosed electrical pass-through assembly may pass high voltage wires (e.g., power feeder wires) in the area outboard of a surge fuel tank located within an aircraft wing. Finally, it is to be appreciated that the pass-through assembly routes the wiring harnesses through the aircraft wing, between the front spar and the rear spar, and therefore allows for electrical power to be supplied to the outboard wing while maintaining separation on the inboard wing. The disclosed electrical pass-through assembly can therefore help to reduce or limit an amount of power feeder wires that are routed along the front or rear spar Further, the disclosure comprises embodiments according to the following clauses:

Clause 1: an electrical pass-through assembly for traversing a structure, the electrical pass-through assembly comprising: a sleeve defining a fixed end, a locked end, a passage extending between the fixed end and the locked end, a mating feature disposed on the fixed end, and a locking feature disposed on the locked end; a fitting configured to attach the structure, the fitting including an inner surface defining an opening shaped to receive the fixed end of the sleeve, wherein a corresponding mating feature is disposed along the inner surface of the fitting and engages with the mating feature disposed at the fixed end of the sleeve to prevent relative rotation between the fitting and the sleeve; and a locking retainer including a corresponding locking feature that securely engages with the locking feature disposed at the locked end of the sleeve.

Clause 2: The system of clause 1, further comprising a tensioning member received by the locked end of the sleeve, wherein the tensioning member is configured to provide tension between the locking retainer and the structure.

Clause 3: The system of any of clause 1 or 2, further comprising one or more wiring harness sleeves, wherein each wiring harness sleeve includes a passageway configured to contain a corresponding wiring harness.

Clause 4: The system of any of clauses 1, 2, or 3, wherein the sleeve includes one or more pairs of blades that extend longitudinally along an inner surface of the sleeve.

Clause 5: The system of clause 4, wherein each wiring harness sleeve includes a sleeve lock engaged between the one or more pairs of blades to prevent relative rotation between the wiring harness sleeve and the sleeve.

Clause 6: The system of any of clauses 4, or 5, wherein each blade of the one or more pairs of blades includes a first retaining feature disposed at the fixed end of the sleeve and a second retaining feature disposed at the locked end of the sleeve.

Clause 7: The system of any of clauses 3, 4, 5, or 6, further comprising a first retaining ring that is secured by the first retaining feature of each blade, wherein the first retaining ring abuts against a first end surface of the one or more wiring harness sleeves to prevent translational movement of the one or more wiring harness sleeves.

Clause 8: The system of any of clauses 3, 4, 5, 6 or 7 further comprising a second retaining ring that engages with the second retaining feature of each blade, wherein the second retaining ring abuts against a second end surface of the one or more wiring harness sleeves to prevent translational movement of the one or more wiring harness sleeves.

Clause 9: The system of any of clauses 3, 4, 5, 6, 7 or 8, wherein the one or more wiring harness sleeves include of a pair of identical wiring harness sleeves that interlock with one another.

Clause 10: The system of any of clauses 1, 2, 3, 4, 5, 6, 7, 8 or 9, wherein the mating feature disposed on the fixed end of the sleeve and the corresponding mating feature disposed along the inner surface of the fitting comprise a one or more interlocking tabs.

Clause 11: The system of any of clauses 1, 2, 3, 4, 5, 6, 7, 8, 9, or 10, wherein the fixed end of the sleeve includes a lip that circumferentially extends around an outer surface of the sleeve, wherein the lip of the sleeve engages with the inner surface of the fitting.

Clause 12: The system of any of clauses 1, 2, 3, 4, 5, 6, 7, 8, 9, 10, or 11, wherein the locking feature disposed on the locked end of the sleeve includes one or more ramped grooves that extend around an outer surface of the sleeve and terminate at an end stop.

Clause 13: The system of clause 12, wherein the corresponding locking feature of the locking retainer includes one or more raised posts, wherein each raised post is configured to lockingly engage with a corresponding end stop of one of the ramped grooves.

Clause 14: The system of any of clauses 1, 2, 3, 4, 5, 6, 7, 8, 9, 10, 11, 12, or 13, further comprising a first dust seal disposed on the fixed end of the sleeve, wherein the first dust seal is split to seal around one or more wiring harnesses.

Clause 15: The system of clause 14, wherein the first dust seal is engaged with a first lip disposed around the opening of the fitting.

Clause 16: The system of any of clauses 1, 2, 3, 4, 5, 6, 7, 8, 9, 10, 11, 12, 13, 14, or 15, further comprising a second dust seal disposed on the locked end of the sleeve, wherein the second dust seal is split to seal around one or more wiring harnesses.

Clause 17: The system of clause 16, wherein the second dust seal is engaged with a second lip disposed around the locking feature.

Clause 18: The system of any of clauses 1, 2, 3, 4, 5, 6, 7, 8, 9, 10, 11, 12, 13, 14, 15, 16, or 17, further comprising one or more wiring harnesses received within the passage of the sleeve, wherein the one or more wiring harnesses extend along a longitudinal axis of the sleeve through both the fixed end and the locked end.

Clause 19: The system of any of clauses 1, 2, 3, 4, 5, 6, 7, 8, 9, 10, 11, 12, 13, 14, 15, 16, 17, or 18, wherein the structure is an aircraft wing comprising a front spar and a rear spar, wherein the electrical pass-through assembly extends lengthwise through the front spar and the rear spar.

Clause 20: an aircraft wing, comprising: a front spar; a rear spar; and an electrical pass-through assembly extending lengthwise through the front spar and the rear spar, wherein the electrical pass-through assembly comprises: a sleeve defining a fixed end, a locked end, a passage extending between the fixed end and the locked end, a mating feature disposed on the fixed end, and a locking feature disposed on the locked end; a fitting configured to attach the front spar, the fitting including an inner surface defining an opening shaped to receive the fixed end of the sleeve, wherein a corresponding mating feature is disposed along the inner surface of the fitting and engages with the mating feature disposed at the fixed end of the sleeve to prevent relative rotation between the fitting and the sleeve; and a locking retainer including a corresponding locking feature that securely engages with the locking feature disposed at the locked end of the sleeve.

Clause 21: a method of installing an electrical pass-through assembly that traverses a structure, the method comprising: attaching a fitting to the structure, wherein the fitting includes an inner surface defining an opening; inserting a sleeve within the opening of the fitting, wherein the sleeve includes a fixed end, a locked end, a passage extending between the fixed end and the locked end, a mating feature disposed on the fixed end, and a locking feature disposed on the locked end; engaging the mating feature disposed on the fixed end of the sleeve with a corresponding mating feature disposed along the inner surface of the fitting to prevent relative rotation between the fitting and the sleeve; securely engaging the locking feature disposed on the locked end of the sleeve with a corresponding locking feature that is part of a locking retainer; and sliding one or more wiring harness sleeves through the sleeve, wherein the one or more wiring harness sleeves extend along a longitudinal axis of the sleeve and extend through both the fixed end and the locked end.

Clause 22: The method according to clause 21, wherein the one or more wiring harness sleeves include a pair of identical wiring harness sleeves, and wherein the method further comprises: interlocking the pair of identical wiring harness sleeves with one another.

Clause 23: The method according to nay of clauses 21 or 22, further comprising: receiving a wiring harness within a passageway of each of the one or more wiring harness sleeves; and sliding a sleeve lock over the passageway of each of the one or more wiring harness sleeves.

Clause 24: The method according to clause 23, positioning the sleeve lock of a corresponding wiring harness sleeve between a pair of blades that extend longitudinally along an inner surface of the sleeve, wherein the sleeve lock is engaged between the pair of blades to prevent relative rotation between the wiring harness sleeve and the sleeve.

Clause 25: The method according to clause 24, wherein the pair of blades includes a first retaining feature disposed at the fixed end of the sleeve, and wherein the method further comprises: securing a first retaining ring by the first retaining feature of the pair of blades, wherein the first retaining ring abuts against an end surface of the one or more wiring harness sleeves to prevent translational movement of the one or more wiring harness sleeves.

Clause 26: The method according to any of clauses 24 or 25, wherein the pair of blades includes a second retaining feature disposed at the fixed end of the sleeve, and wherein the method further comprises: securing a second retaining ring by the second retaining feature of the pair of blades, wherein the second retaining ring abuts against an end surface of the one or more wiring harness sleeves to prevent translational movement of the one or more wiring harness sleeves.

Clause 27: The method according to any of clauses 21, 22, 23, 24, 25, or 26, further comprising: engaging a first dust seal with a first lip disposed around the opening of the fitting; and engaging a second dust seal with a second lip disposed around the locking feature.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical pass-through assembly for traversing a structure, the electrical pass-through assembly comprising:
    a sleeve defining a fixed end, a locked end, a passage extending between the fixed end and the locked end, a mating feature disposed on the fixed end, and a locking feature disposed on the locked end;
    a fitting configured to attach to the structure, the fitting including an inner surface defining an opening shaped to receive the fixed end of the sleeve, wherein a corresponding mating feature is disposed along the inner surface of the fitting and engages with the mating feature disposed at the fixed end of the sleeve to prevent relative rotation between the fitting and the sleeve, and wherein the structure is an aircraft wing comprising a front spar and a rear spar and the electrical pass-through assembly extends lengthwise through the front spar and the rear spar; and
    a locking retainer including a corresponding locking feature that securely engages with the locking feature disposed at the locked end of the sleeve.

2. The electrical pass-through assembly of claim 1, further comprising a tensioning member received by the locked end of the sleeve, wherein the tensioning member is configured to provide tension between the locking retainer and the structure.

3. The electrical pass-through assembly of claim 1, further comprising one or more wiring harness sleeves, wherein each wiring harness sleeve includes a passageway configured to contain a corresponding wiring harness.

4. The electrical pass-through assembly of claim 3, wherein the sleeve includes one or more pairs of blades that extend longitudinally along an inner surface of the sleeve.

5. The electrical pass-through assembly of claim 4, wherein each wiring harness sleeve includes a sleeve lock engaged between the one or more pairs of blades to prevent relative rotation between the wiring harness sleeve and the sleeve.

6. The electrical pass-through assembly of claim 4, wherein each blade of the one or more pairs of blades includes a first retaining feature disposed at the fixed end of the sleeve and a second retaining feature disposed at the locked end of the sleeve.

7. The electrical pass-through assembly of claim 6, further comprising a first retaining ring that is secured by the first retaining feature of each blade, wherein the first retaining ring abuts against a first end surface of the one or more wiring harness sleeves to prevent translational movement of the one or more wiring harness sleeves.

8. The electrical pass-through assembly of claim 7, further comprising a second retaining ring that engages with the second retaining feature of each blade, wherein the second retaining ring abuts against a second end surface of the one or more wiring harness sleeves to prevent translational movement of the one or more wiring harness sleeves.

9. The electrical pass-through assembly of claim 3, wherein the one or more wiring harness sleeves include of a pair of identical wiring harness sleeves that interlock with one another.

10. The electrical pass-through assembly of claim 1, wherein the mating feature disposed on the fixed end of the sleeve and the corresponding mating feature disposed along the inner surface of the fitting comprise a one or more interlocking tabs.

11. The electrical pass-through assembly of claim 1, wherein the fixed end of the sleeve includes a lip that circumferentially extends around an outer surface of the sleeve, wherein the lip of the sleeve engages with the inner surface of the fitting.

12. The electrical pass-through assembly of claim 1, wherein the locking feature disposed on the locked end of the sleeve includes one or more ramped grooves that extend around an outer surface of the sleeve and terminate at an end stop.

13. The electrical pass-through assembly of claim 12, wherein the corresponding locking feature of the locking retainer includes one or more raised posts, wherein each raised post is configured to lockingly engage with a corresponding end stop of one of the ramped grooves.

14. The electrical pass-through assembly of claim 1, further comprising a first dust seal disposed on the fixed end of the sleeve, wherein the first dust seal is split to seal around one or more wiring harnesses.

15. The electrical pass-through assembly of claim 14, wherein the first dust seal is engaged with a first lip disposed around the opening of the fitting.

16. The electrical pass-through assembly of claim 1, further comprising a second dust seal disposed on the locked end of the sleeve, wherein the second dust seal is split to seal around one or more wiring harnesses.

17. The electrical pass-through assembly of claim 16, wherein the second dust seal is engaged with a second lip disposed around the locking feature.

18. The electrical pass-through assembly of claim 1, further comprising one or more wiring harnesses received within the passage of the sleeve, wherein the one or more wiring harnesses extend along a longitudinal axis of the sleeve through both the fixed end and the locked end.

19. A method of installing an electrical pass-through assembly that traverses a structure, the method comprising:
    attaching a fitting to the structure, wherein the fitting includes an inner surface defining an opening;
    inserting a sleeve within the opening of the fitting, wherein the sleeve includes a fixed end, a locked end, a passage extending between the fixed end and the locked end, a mating feature disposed on the fixed end, and a locking feature disposed on the locked end;
    engaging the mating feature disposed on the fixed end of the sleeve with a corresponding mating feature disposed along the inner surface of the fitting to prevent relative rotation between the fitting and the sleeve;
    securely engaging the locking feature disposed on the locked end of the sleeve with a corresponding locking feature that is part of a locking retainer; and
    sliding one or more wiring harness sleeves through the sleeve, wherein the one or more wiring harness sleeves extend along a longitudinal axis of the sleeve and extend through both the fixed end and the locked end.

20. An electrical pass-through assembly for traversing a structure, the electrical pass-through assembly comprising:
    a sleeve defining a fixed end, a locked end, a passage extending between the fixed end and the locked end, a mating feature disposed on the fixed end, and a locking feature disposed on the locked end;
    a fitting configured to attach to the structure, the fitting including an inner surface defining an opening shaped to receive the fixed end of the sleeve, wherein a corresponding mating feature is disposed along the inner surface of the fitting and engages with the mating feature disposed at the fixed end of the sleeve to prevent relative rotation between the fitting and the sleeve;

a locking retainer including a corresponding locking feature that securely engages with the locking feature disposed at the locked end of the sleeve; and one or more wiring harness sleeves, wherein each wiring harness sleeve includes a passageway configured to contain a corresponding wiring harness, and wherein the sleeve includes one or more pairs of blades that extend longitudinally along an inner surface of the sleeve, and wherein each wiring harness sleeve includes a sleeve lock engaged between the one or more pairs of blades to prevent relative rotation between the wiring harness sleeve and the sleeve.

* * * * *